US009650452B2

(12) United States Patent
Brandau et al.

(10) Patent No.: US 9,650,452 B2
(45) Date of Patent: May 16, 2017

(54) VULCANIZABLE COMPOSITIONS BASED ON NITRILE RUBBERS CONTAINING EPOXY GROUPS

(75) Inventors: Sven Brandau, Strasbourg (FR); Michael Klimpel, Langenfeld (DE); Hans Magg, Kurten (DE); Achim Welle, Leverkusen (DE)

(73) Assignee: ARLANXEO Deutschland GmbH, Dormagen (DE)

( * ) Notice: Subject to any disclaimer, the term of this patent is extended or adjusted under 35 U.S.C. 154(b) by 29 days.

(21) Appl. No.: 13/995,268

(22) PCT Filed: Dec. 29, 2011

(86) PCT No.: PCT/EP2011/074222
§ 371 (c)(1),
(2), (4) Date: Jan. 2, 2014

(87) PCT Pub. No.: WO2012/089804
PCT Pub. Date: Jul. 5, 2012

(65) Prior Publication Data
US 2014/0114025 A1 Apr. 24, 2014

(30) Foreign Application Priority Data

Dec. 29, 2010 (EP) .................................... 10290683

(51) Int. Cl.
C08F 24/00 (2006.01)
C08K 5/00 (2006.01)
C08K 5/19 (2006.01)

(52) U.S. Cl.
CPC ............ C08F 24/00 (2013.01); C08K 5/0091 (2013.01); C08K 5/19 (2013.01)

(58) Field of Classification Search
None
See application file for complete search history.

(56) References Cited

U.S. PATENT DOCUMENTS

| | | | |
|---|---|---|---|
| 3,697,489 A | 10/1972 | Chadha | |
| 3,700,637 A | 10/1972 | Finch, Jr. | |
| 4,094,831 A | 6/1978 | Sandstrom | |
| 4,101,273 A | 7/1978 | Matsuba et al. | |
| 4,160,757 A * | 7/1979 | Honda ............... | C08G 18/6453 524/432 |
| 4,464,515 A | 8/1984 | Rempel et al. | |
| 4,503,196 A | 3/1985 | Rempel et al. | |
| 4,581,417 A | 4/1986 | Buding et al. | |
| 4,631,315 A | 12/1986 | Buding et al. | |
| 4,650,834 A | 3/1987 | Yagishita et al. | |
| 4,675,362 A | 6/1987 | Miyabayashi et al. | |
| 4,746,707 A | 5/1988 | Fiedler et al. | |
| 4,795,788 A | 1/1989 | Himmler et al. | |
| 4,812,528 A | 3/1989 | Rempel et al. | |
| 4,816,525 A | 3/1989 | Rempel et al. | |
| 4,826,721 A | 5/1989 | Obrecht et al. | |
| 4,897,106 A | 1/1990 | Shida et al. | |
| 4,978,771 A | 12/1990 | Fiedler et al. | |
| 5,079,294 A | 1/1992 | Yang et al. | |
| 5,093,426 A * | 3/1992 | Sakabe et al. ................. 525/223 | |
| 5,334,666 A * | 8/1994 | Yagishita ............. | C08G 59/027 525/327.3 |
| 5,550,190 A * | 8/1996 | Hasegawa et al. ......... 525/92 A | |
| 6,066,697 A | 5/2000 | Coran | |
| 6,307,624 B1 | 10/2001 | Bruck et al. | |
| 6,522,408 B1 | 2/2003 | Bruck et al. | |
| 6,559,219 B2 | 5/2003 | Tadaki et al. | |
| 6,683,136 B2 | 1/2004 | Guo et al. | |
| 6,713,534 B2 | 3/2004 | Goerl et al. | |
| 6,984,706 B2 | 1/2006 | Karato et al. | |
| 7,662,889 B2 | 2/2010 | Obrecht et al. | |
| 7,951,875 B2 | 5/2011 | Guerin et al. | |
| 8,044,138 B2 | 10/2011 | Han et al. | |
| 8,664,315 B2 | 3/2014 | Obrecht | |
| 2002/0045691 A1 | 4/2002 | Konno et al. | |
| 2002/0091189 A1 | 7/2002 | Sakata et al. | |
| 2002/0120052 A1 | 8/2002 | Wendling et al. | |
| 2003/0036593 A1 | 2/2003 | Goerl et al. | |
| 2003/0096917 A1 | 5/2003 | Hattori et al. | |
| 2006/0254734 A1 | 11/2006 | Hannay et al. | |
| 2010/0152365 A1 | 6/2010 | Han et al. | |
| 2010/0179277 A1 | 7/2010 | Soddemann et al. | |
| 2011/0123748 A1 | 5/2011 | Obrecht | |

(Continued)

FOREIGN PATENT DOCUMENTS

CN 101130679 A 2/2008
DE 2539132 3/1977

(Continued)

OTHER PUBLICATIONS

Sun, Journal of Applied Polymer Science, vol. 122, Issue 5, (2011) 2992-2999.*
Sun, Polymer, 46 (2005) 7632-7643.*
English abstract of JP H03-255185, 1991.*
Computer Translation of JPH 04-314391 (1992).*
Hoffman, M., "Vulcanizate Structure, Relaxation, and Tensile Strength of Polyisoprenes", Rubber Chem. Technol., 1963, vol. 36 pp. 815-834.
Ulmann's Encyclopedia of Industrial Chemistry, VCH Verlagsgesellschnft mbH, D-69451, Weinheim, 1993, vol. A23, Rubber, 4 "Chemicals & Additives", p. 366-417.
Papke, N, European Polymer Journal 37, (2001), p. 547-557.
Hale, W., "Effect of crosslinking reactions and order of mixing on properties of compatibilized PBT/ABS blends", Department of Chemical Engineering and Center for Polymer Research, Polymer 40, 1999, pp. 3665-3676.
Li, Yongjin, "Improvement in toughness of poly(l-Lactide) (PLLA) through reactive blending with acrylonitrile-butadiene-styrene copolymer (ABS): Morphology and properties", European Polymer Journal, 45, (2009) pp. 738-746.

(Continued)

*Primary Examiner* — Robert C Boyle

(57) ABSTRACT

There are provided novel vulcanizable compositions based on optionally fully or partly hydrogenated nitrile rubbers containing epoxy groups, and specific crosslinkers, which no longer require use of conventional crosslinkers, more particularly sulphur. The vulcanizates producible therefrom possess very good compression sets at room temperature, 100° C. and 150° C., and additionally exhibit high tensile strength combined with good elongation at break.

17 Claims, No Drawings

(56) References Cited

U.S. PATENT DOCUMENTS

| | | |
|---|---|---|
| 2013/0206453 A1 | 8/2013 | Fagrell et al. |
| 2013/0237667 A1 | 9/2013 | Brandau et al. |
| 2014/0114025 A1 | 4/2014 | Brandau et al. |
| 2014/0256886 A1 | 9/2014 | Brandau et al. |

FOREIGN PATENT DOCUMENTS

| | | | |
|---|---|---|---|
| EP | 0112109 | A1 | 6/1984 |
| EP | 0471250 | A1 | 2/1992 |
| EP | 0559515 | A1 | 8/1993 |
| EP | 0559515 | * | 9/1993 |
| JP | 55120640 | A | 9/1980 |
| JP | 58191769 | | 11/1983 |
| JP | 61235424 | A | 10/1986 |
| JP | 63218752 | A | 9/1988 |
| JP | 63057629 | | 12/1988 |
| JP | 1113477 | A | 5/1989 |
| JP | 03255185 | | 11/1991 |
| JP | H03-255185 | * | 11/1991 |
| JP | H 04-314391 | * | 11/1992 |
| JP | 2000143874 | A | 5/2000 |
| JP | 2001151943 | A | 6/2001 |
| JP | 2001192505 | A | 7/2001 |
| JP | 2005120143 | A | 5/2005 |
| JP | 2008088241 | | 4/2008 |
| JP | 2008088241 | A | 4/2008 |
| TW | 201016726 | A | 7/2009 |
| WO | 0126750 | A1 | 4/2001 |
| WO | 2011079799 | A1 | 7/2011 |

OTHER PUBLICATIONS

Sun, S., Polylactide Toughening with Epoxy-Functionalized Grafted Acrylonitrile-Butadiene-Styrene Particles, Journal of Applied Polymer Science, vol. 122, pp. 2992-2999 (2011).
Sun, S.L., "Toughening of poly(butylene terephthalate) with epoxy-functionalized acrylonitrile-butadiene-styrene", Institute of Chemical Engineering, Polymer 46, 2005, pp. 7632-7643.
Celestino, M.L., Acrylic Rubber/Nitrile Rubber Blends: The Effect of Curatives on the Mechanical, Morphological, and Dynamic Mechanical Properties, Journal of Applied Polymer Science, vol. 113, pp. 721-729 (2009).
European Search Report from co-pending Application EP10290683 dated Jun. 10, 2011, 2 pages.
European Search Report from co-pending Application EP11290470 dated Mar. 14, 2012, 1 pages.
International Search Report from co-pending Application PCT/EP2012/070067, dated Nov. 5, 2012, 3 pages.
International Search Report from co-pending Application PCT/EP2011/074222, dated Mar. 15, 2012, 3 pages.
International Search Report from co-pending Application PCT/EP2011/074249, dated Mar. 12, 2012, 3 pages.
International Search Report from co-pending Application PCT/EP2012/070065, dated Nov. 7, 2012, 2 pages.
https://en.wikipedia.org/wiki/Nitrile_rubber, "Nitrile Rubber" retrieved on Jan. 26, 2016.
htttps://en.wikipedia.org/wiki/Acrylonitrile_butadiene_styrene, "Acrylonitrile butadiene styrene", retrieved on Jan. 26, 2016.
https://en.wikipedia.org/wiki/Compounds_of_zinc, "Compounds of zinc", retrieved on Jan. 26, 2016.
Hale, W. et al., Polymer 40, 1999, p. 365-377.
Wohl, R., J. Org. Chem., vol. 58, 1973, 1787-1790.
InfoChem, Nocceler EP-10, Iron(iii) dimethyldithlocarbamate and 2-mercaptobenzothiazole, 2000-20004-, one page.

* cited by examiner

VULCANIZABLE COMPOSITIONS BASED ON NITRILE RUBBERS CONTAINING EPOXY GROUPS

The invention relates to vulcanizable compositions based on optionally fully or partly hydrogenated nitrile rubbers containing epoxy groups, and specific crosslinkers, to a process for production thereof, to a process for production of vulcanizates therefrom, to the vulcanizates thus obtained, and to fully or partly hydrogenated nitrile rubbers containing epoxy groups.

Nitrile rubbers, often also abbreviated to "NBR", are understood to mean rubbers which are co- or terpolymers of at least one α,β-unsaturated nitrile, at least one conjugated diene and optionally one or more further copolymerizable monomers. Hydrogenated nitrile rubbers ("HNBR") are understood to mean corresponding co- or terpolymers in which some or all of the C=C double bonds of the copolymerized diene units have been hydrogenated.

For many years, both NBR and HNBR have occupied an established position in the specialty elastomers sector. They possess an excellent profile of properties in the form of excellent oil resistance, good heat stability, excellent resistance to ozone and chemicals, the latter being even more pronounced in the case of HNBR than in the case of NBR. NBR and HNBR also have very good mechanical and performance properties. For this reason, they are widely used in a wide variety of different fields of use, and are used, for example, for production of gaskets, hoses, belts and damping elements in the automotive sector, and also for stators, well seals and valve seals in the oil production sector, and also for numerous parts in the electrical industry, mechanical engineering and shipbuilding. A multitude of different types are commercially available, and these feature, according to the application sector, different monomers, molecular weights, polydispersities and mechanical and physical properties. As well as the standard types, there is increasing demand particularly for specialty types featuring contents of specific termonomers or particular functionalizations.

In practical use of (H)NBR rubbers, the vulcanization of the rubbers is also becoming increasingly important, i.e. particularly the crosslinker system and the vulcanization conditions. Thus, in addition to the conventional rubber crosslinking systems based on peroxides or sulphur, which have already been in existence for several decades, the last few years have seen developments of various new concepts for alternative crosslinking. Such crosslinking concepts also include polymers which, due to functional groups, are not amenable to all forms of crosslinking and crosslinking agents and therefore constitute a particular challenge.

U.S. Pat. No. 4,094,831 describes the crosslinking of co- or terpolymers of conjugated $C_4$-$C_{10}$-conjugated dienes, optionally additionally $C_2$-$C_{14}$-olefins and a monomer comprising epoxy groups, by using mono- and polyamines, mono- and polyanhydrides, and mono- and polycarboxylic acids. Acrylonitrile is not used as a monomer for preparation of these co- or terpolymers.

Polymer 46 (2005) 7632-7643 describes the preparation of glycidyl methacrylate-grafted acrylonitrile-butadiene-styrene copolymers (ABS-g-GMA) by emulsion polymerization. This ABS-g-GMA polymer is subsequently used to produce a blend with polybutylene terephthalate (PBT). Good dispersibility of the ABS-g-GMA particles in the PBT matrix is reported, and this is attributed to reaction between carboxyl/hydroxyl groups of the PBT chain ends and the epoxy groups of the GMA units at the interface.

The crosslinking of nitrile rubbers containing epoxy groups with sulphur compounds or peroxide compounds is known per se. WO-A-02/46254 describes quaterpolymers with functional hydroxyl or epoxy groups, which are formed from conjugated dienes, vinyl-substituted aromatics, olefinically unsaturated nitriles and vinyl monomers containing hydroxyl groups or epoxy groups. Crosslinkers specified for vulcanization of these quaterpolymers are sulphur and sulphur donors such as polysulphides, for example dithiocarbamates and thiuram polysulphides. According to the examples of WO-A-02/46254, the sulphur crosslinker is used in amounts of 1.5 parts by weight, based on 100 parts by weight of all rubbers present in the vulcanizable mixture.

JP-A-2005/120143 relates to rubbers containing repeat units of an unsaturated nitrile, of at least one acrylic ester, of an epoxy monomer, of at least one nonconjugated cyclic polyene and optionally of further unsaturated monomers, for example butadiene. Crosslinking agents specified are sulphur, organic peroxides or metal salts of aromatic or aliphatic carboxylic acids or anhydrides thereof.

European Polymer Journal 37 (2001), pages 547-557 describes glycidyl methacrylate-grafted nitrile rubbers which are used as compatibilizers in polymer mixtures. They are prepared by peroxidically initiated graft reaction of glycidyl methacrylate onto the NBR rubber.

EP-A-0 160 399 describes quaterpolymers based on a cyano-substituted alkyl (meth)acrylate, an alkyl acrylate, a crosslinkable monomer and a further unsaturated monomer for applications particularly in the automotive sector, where a high use temperature, good stability to ozone and acidic petroleum or gasohol is required. The crosslinkable monomer used may also be a monomer comprising epoxy groups. Crosslinking agents specified in the case of unsaturated polymers include sulphur, sulphur donors or peroxides, and in the presence of epoxide groups the crosslinking thereof by polyamines and salts thereof, ammonium compounds, or in combination with conventional crosslinking systems.

Polymer 40 (1999), pages 3665-3676 describes using a specific methyl methacrylate/glycidyl methacrylate/ethyl acrylate terpolymer (MGE) to increase the compatibility of polybutylene terephthalate (PBT) with acrylonitrile-butadiene-styrene terpolymers (ABS) in blends. It is stated that residual amounts of acids remaining in the ABS prepared by emulsion polymerization can lead to crosslinking reactions involving the epoxy functionalities of MGE. It is explained that nitrile and epoxide functions can form oxazolines as a subsequent reaction, or nitriles can be hydrolysed to give carboxyl groups, which can likewise react with epoxy groups. Evidence is presented that these crosslinkings have an adverse effect on the mechanical properties of the ABS and of the blend, and it is concluded, moreover, that strong acids can cause the formation of a gel or of a crosslinked network in the SAN matrix, provided that the MGE terpolymer is present.

It was an object of the present invention to provide a thermally stable crosslinking system for nitrile rubbers containing epoxide groups, by virtue of which it is possible to substantially reduce or entirely avoid the use of peroxidic or sulphur-containing crosslinkers and toxic heavy metal-containing crosslinking catalysts in vulcanizable compositions based on nitrile rubbers containing epoxy groups.

The novel crosslinking system shall avoid the disadvantages of the existing crosslinkers, be simple to introduce into the vulcanizable nitrile rubber compositions and enable a crosslinking reaction under uncomplicated conditions. The crosslinkers used should thus have good handling qualities and low toxicity and should be usable equally successfully for nitrile rubbers containing epoxide groups and for hydrogenated nitrile rubbers containing epoxide groups. The thus crosslinked (H)NBR rubbers containing epoxide groups shall as far as possible have good to very good values in the compression set test, especially at high temperatures, exhibit a good combination of elongation at break and tensile strength, and hence offer an alternative to or improvement over the conventional systems.

The object is achieved by a vulcanizable composition comprising
(i) at least one optionally fully or partly hydrogenated nitrile rubber containing epoxy groups and comprising repeat units derived from at least one conjugated diene, at least one α,β-unsaturated nitrile and optionally one or more further copolymerizable monomers, but not from a non-conjugated cyclic polyene, and
(ii) at least one Lewis and/or Brønsted acid as a crosslinker, said vulcanizable composition comprising crosslinkers other than those specified under (ii) only in an amount of less than 2.5 parts by weight, based on 100 parts by weight of the optionally fully or partly hydrogenated nitrile rubber (i) containing epoxy groups.

Surprisingly, in the case of the inventive use of the aforementioned crosslinkers (ii) in the vulcanizable composition, thermally stable networks can be formed. The crosslinking or vulcanization is catalysed by the Lewis and/or Brønsted acid(s).

In an alternative embodiment, the Lewis and/or Brønsted acid(s) can also be used in the form of a buffer mixture comprising the latter.

The vulcanizable mixture is in solid form and preferably does not comprise any organic solvents at all, more particularly none of the following solvents selected from the group consisting of methyl ethyl ketone, acetone, methyl isobutyl ketone, toluene, xylene, ethyl acetate, butyl acetate and mixtures thereof.

Amount of Crosslinker (ii):

The inventive composition comprises suitably 0.01 to 30 parts by weight, preferably 0.05 to 25 parts by weight, more preferably 0.1 to 20 parts by weight, even more preferably 0.2 to 15 parts by weight, especially 1 to 15 parts by weight and especially preferably greater than 1 to 12.5 parts by weight, based in each case on 100 parts by weight of the nitrile rubber (i), of at least one Lewis and/or Brønsted acid as a crosslinker (ii).

Amount of Other Crosslinkers:

The amount used of crosslinkers other than those specified under (ii), for example sulphur, sulphur donors and peroxides, can be reduced drastically, or it may even be possible to completely dispense with other crosslinkers. In one embodiment, the vulcanizable composition comprises crosslinkers other than those specified under (ii) up to a maximum amount of 2.3 parts by weight, preferably up to a maximum amount of 2 parts by weight, more preferably up to a maximum amount of less than 1.5 parts by weight, even more preferably up to a maximum amount of 1.25 parts by weight, especially up to a maximum amount of 1 part by weight, especially preferably up to a maximum amount of 0.5 part by weight, and very especially preferably up to a maximum amount of 0.4 part by weight, based on 100 parts by weight of the optionally fully or partly hydrogenated nitrile rubber (i) containing epoxy groups. If the vulcanizable composition also comprises one or more rubbers other than those specified under (i), crosslinkers other than those specified under (ii) are present only in an amount of less than 1.5 parts by weight, preferably up to a maximum amount of 1.3 parts by weight, more preferably up to a maximum amount of 1.25 parts by weight, even more preferably up to a maximum amount of 1 part by weight, especially up to a maximum amount of 0.75 part by weight, especially preferably up to a maximum amount of 0.4 part by weight, and very especially preferably up to a maximum amount of 0.35 part by weight, based on 100 parts by weight of the sum of the optionally fully or partly hydrogenated nitrile rubber (i) containing epoxy groups and all other rubbers present in the composition. Compared to vulcanizable compositions also including a relatively large amount of other crosslinkers as well as the crosslinker (ii), the inventive compositions have the advantage of leading to vulcanizates with improved, i.e. lower, compression set, especially at relatively high temperatures.

It is possible that the vulcanizable composition does not comprise any other crosslinker at all apart from the crosslinker(s) (ii). In addition, it is also possible to dispense with the use of the known cocatalysts, and so heavy metal-free vulcanizates are obtainable. In one embodiment, the vulcanizable composition does not comprise any cocatalysts, more particularly any heavy metal-containing cocatalysts. In a further embodiment, the inventive vulcanizable composition does not comprise any other crosslinkers apart from the crosslinker(s) (ii), or any further cocatalysts, more particularly any heavy metal-containing cocatalysts. The crosslinking density can be controlled and adjusted within wide ranges through the proportion of epoxy groups in the nitrile rubber. The resulting vulcanizates exhibit excellent values in the compression set test at temperatures from room temperature up to temperatures of 150° C.

In one embodiment, the nitrile rubber may also be a fully or partly hydrogenated nitrile rubber in which some or all of the C═C double bonds present in the repeat units of the nitrile rubber have been hydrogenated.

Crosslinker (ii): Lewis and/or Brønsted Acid(s)

The Lewis or Brønsted acids used may be any suitable inorganic or organic acids. It has been found to be useful to use Lewis acids which are electron pair acceptors, or Brønsted acids which are proton donors and have a $pK_a$ in the range from −12 to +13, preferably in the range from −11 to +12, more preferably in the range from −10.5 to +10, even more preferably in the range from −10 to +9.5 and especially in the range from −10 to +8.

The Lewis and/or Brønsted acid(s) used in each case may alternatively also be part of a buffer mixture. As well as the particular acid, a salt of the acid is typically also present therein. In such buffer mixtures, the acid and the acid salt are preferably present in a molar ratio of 99.9% to 0.1% of the acid and 0.1% to 99.9% of the acid salt. Particular preference is given to a molar ratio of 99.0 to 1% of the acid and 1 to 99.0% of the acid salt.

The inventive vulcanizable composition preferably comprises, as crosslinker (ii), at least one inorganic or organic Brønsted and/or Lewis acid. Alternatively, this may be present in any buffer mixture used.

Lewis Acids:

Any of the Lewis acids used which is an electron pair acceptor may be
(a) a transition metal or semimetal in elemental form or
(b) an alkyl or aryl compound, ester, salt, complex or oxide of the alkali metals, alkaline earth metals, transition metals or semimetals, of aluminium, gallium, indium, tin, thallium, lead, nitrogen or phosphorus.

Any of the Lewis acids used which is an electron pair acceptor may preferably be
(a) a transition metal or semimetal in elemental form, or
(b) an alkyl or aryl compound, ester, salt, complex or oxide of the alkali metals, alkaline earth metals, transition metals or semimetals, of aluminium, indium, tin, lead or phosphorus.

The Lewis acids used are more preferably salts, complexes or oxides of the alkali metals, alkaline earth metals, transition metals, semimetals, or of the elements aluminium and tin.

Examples of preferred Lewis acids are boron trifluoride, boron trihydride, aluminium trichloride, indium(III) chloride, copper(II) chloride, copper(I) triflate, gold(III) chloride, gold(I) chloride, zinc chloride, zinc oxide, tin(IV) oxide, tin(IV) chloride, copper(II) oxide, iron(II) oxide, iron(III) oxide, iron(III) bromide, iron(III) chloride, sulphur trioxide, silicon tetrachloride, lithium bromide, lithium chloride, magnesium oxide, magnesium chloride, scandium(III) triflate, rhodium(III) chloride and complexes of the following elements in the following oxidation states: Co(III), Fe(III), Fe(II), Ti(IV), Sn(IV), Co(II), Ni(0), Cu(II), Cu(I), Zn(II), Pb(II), Sn(II), Sn(IV), Ag(I), Au(I), Au(III), Pd(II), Pt(II), Sc(III), Ir(III), Rh(III) and In(III). Any of the specific Lewis acids mentioned above can be used as the hydrate, with any amount of water of crystallization, or anhydrate.

Brønsted Acids:

The inventive vulcanizable composition may comprise, as crosslinker (ii), at least one Brønsted acid. Preference is given to Brønsted acids which are proton donors and have a $pK_a$ in the range from −12 to +13, preferably in the range from −11 to +12, more preferably in the range from −10.5 to +10, even more preferably in the range from −10 to +9.5 and especially in the range from −10 to +8. It is more preferably selected from the group consisting of sulphuric acid, hydrogensulphates, sulphurous acid, hydrogensulphites, hydrogen sulphide, hydrogensulphides, monohydrogenphosphates, dihydrogenphosphates, diphosphonic acid, the partial esters thereof, metaphosphoric acid, triphosphonic acid, the partial esters thereof, hydrogencarbonates, acids of the halogens, hypohalous acids, halous acids, halic acids, perhalic acids, ammonium salts, inorganic and organic sulphonic acid, carboxylic acid, phosphonic acid, and the mono- or diesters thereof. Alternatively, it is also possible to use buffer mixtures comprising the latter.

Useful hydrogensulphates are preferably an alkali metal hydrogensulphate or a hydrogensulphate with a quarternary nitrogen atom in the counterion, particular preference being given to a tetraalkylammonium hydrogensulphate, especially to a tetra($C_1$-$C_{12}$)alkylammonium hydrogensulphate, or an ammonium hydrogensulphate. Examples of especially preferred hydrogensulphates are potassium hydrogensulphate and tetra-n-butylammonium hydrogensulphate.

Useful hydrogensulphites are preferably an alkali metal hydrogensulphite or a hydrogensulphite with a quarternary nitrogen atom in the counterion, especially a tetraalkylammonium hydrogensulphite, or an ammonium hydrogensulphite. Examples of preferred hydrogensulphites are potassium hydrogensulphite and ammonium hydrogensulphite.

Useful hydrogensulphides are preferably an alkali metal hydrogensulphide or a hydrogensulphide with a quarternary nitrogen atom in the counterion, especially a tetraalkylammonium hydrogensulphide, or an ammonium hydrogensulphide. Examples of preferred hydrogensulphides are potassium hydrogensulphide and ammonium hydrogensulphide.

Further useful crosslinkers (ii) are mono- or dihydrogenphosphates, diphosphonic acid or a partial ester thereof, metaphosphoric acid, triphosphonic acids and partial esters thereof. Preference is given to 1-hydroxyethyl-(1,1-diphosphonic acid), dipotassium hydrogenphosphate, potassium dihydrogenphosphate, disodium hydrogenphosphate, sodium dihydrogenphosphate, calcium hydrogenphosphate, calcium dihydrogenphosphate, trisodium hydrogendiphosphate and disodium dihydrogendiphosphate.

Useful hydrogencarbonates are preferably sodium hydrogencarbonate, potassium hydrogencarbonate and lithium hydrogencarbonate.

Useful ammonium salts are preferably ammonium chloride, ammonium sulphate, ammonium carbonate, ammonium hydroxide and ammonium acetate.

Further useful crosslinkers (ii) include an acid of the halogens, a hypohalous acid, a halous acid, a halic acid or a perhalic acid, preference being given to hydrochloric acid, hydrogen bromide, hypochlorous acid, chlorous acid, chloric acid and perchloric acid.

Other useful crosslinkers (ii) include inorganic or organic sulphonic acids, preference being given to organic sulphonic acids, particular preference to alkylbenzylsulphonic acids, especially dodecylbenzylsulphonic acid and p-toluenesulphonic acid.

The crosslinkers (ii) used may also be inorganic or organic phosphonic acids, and the mono- or diesters thereof, preference being given to aminotrimethylenephosphonic acid and ethylenediaminetetra(methylenephosphonic acid).

Preferred organic carboxylic acids are ascorbic acid, acetic acid, propionic acid, acrylic acid, fumaric acid, maleic acid, benzoic acid, abietic acid, saturated and unsaturated fatty acids, especially stearic acid and oleic acid.

One example of a suitable buffer system is a mixture of ascorbic acid and sodium ascorbate.

In a preferred embodiment, the inventive vulcanizable composition comprises
(i) at least one optionally fully or partly hydrogenated nitrile rubber containing epoxy groups and comprising repeat units derived from at least one conjugated diene, at least one α,β-unsaturated nitrile and optionally one or more further copolymerizable monomers, but not from a non-conjugated cyclic polyene, and
(ii) at least one Lewis acid selected from the group consisting of boron trifluoride, aluminium trichloride, indium (III) chloride, zinc chloride, zinc oxide, iron(II) oxide, iron(III) oxide, iron(III) chloride, silicon tetrachloride, lithium bromide, lithium chloride, magnesium oxide, magnesium chloride, scandium(III) triflate and rhodium (III) chloride and/or a Brønsted acid selected from the group consisting of potassium hydrogensulphate, ammonium hydrogensulphate, tetraalkylammonium hydrogensulphate, especially tetra-n-butylammonium hydrogensulphate, potassium dihydrogenphosphate, di sodium hydrogenphosphate, sodium dihydrogenphosphate, ammonium chloride, ammonium sulphate, ammonium carbonate, ammonium hydroxide, ammonium acetate, dodecylbenzylsulphonic acid, p-toluenesulphonic acid, ascorbic acid, acetic acid, acrylic acid, fumaric acid, maleic acid, benzoic acid, abietic acid, saturated and unsaturated fatty acids, especially stearic acid and oleic acid, or a buffer mixture comprising the latter, as a crosslinker, said vulcanizable composition comprising crosslinkers other than those specified under (ii) only in an amount of less than 2.5 parts by weight, based on 100 parts by weight of the nitrile rubber (i) containing epoxy groups.

The amount of crosslinker (ii) can be selected according to the concentration of the epoxy groups in the nitrile rubber.

The vulcanizable composition typically comprises
(i) at least one optionally fully or partly hydrogenated nitrile rubber containing epoxy groups and comprising repeat units derived from at least one conjugated diene, at least one α,β-unsaturated nitrile and optionally one or more further copolymerizable monomers, but not from a nonconjugated cyclic polyene, and
(ii) 0.01 to 30 parts by weight, preferably 0.05 to 25 parts by weight, more preferably 0.1 to 20 parts by weight and especially 0.2 to 15 parts by weight, especially preferably 1 to 15 parts by weight and very especially preferably greater than 1 to 12.5 parts by weight, based in each case on 100 parts by weight of the nitrile rubber (i), of at least one Lewis and/or Brønsted acid or of a buffer mixture comprising the latter,
said vulcanizable composition comprising crosslinkers other than those specified under (ii) only in an amount of less than 2.5 parts by weight, based on 100 parts by weight of the fully or partly hydrogenated nitrile rubber (i) containing epoxy groups.

Preference is given to vulcanizable compositions comprising
(i) at least one optionally fully or partly hydrogenated nitrile rubber containing epoxy groups and comprising repeat units derived from at least one conjugated diene, at least one α,β-unsaturated nitrile, at least one monomer containing epoxy groups, and optionally one or more further copolymerizable monomers, but not from a nonconjugated cyclic polyene, and
(ii) 0.01 to 30 parts by weight, preferably 0.05 to 25 parts by weight, more preferably 0.1 to 20 parts by weight and especially 0.2 to 15 parts by weight, especially preferably 1 to 15 parts by weight and very especially preferably greater than 1 to 12.5 parts by weight, based in each case on 100 parts by weight of the nitrile rubber (i), of at least one Lewis and/or Brønsted acid or of a buffer mixture comprising the latter,
said vulcanizable composition comprising crosslinkers other than those specified under (ii) only in an amount of less than 2.5 parts by weight, based on 100 parts by weight of the fully or partly hydrogenated nitrile rubber (i) containing epoxy groups.

The at least one optionally fully or partly hydrogenated nitrile rubber (i) has, in this preferred composition, more preferably exclusively repeat units which derive from at least one conjugated diene, at least one α,β-unsaturated nitrile and at least one monomer containing epoxy groups.

According to the invention, the Lewis and/or Brønsted acids or buffer mixtures comprising the latter are added to the optionally fully or partly hydrogenated nitrile rubber containing epoxy groups after the production thereof. The acids are thus not those which are released or are already present in the course of production of the optionally fully or partly hydrogenated nitrile rubber, especially coagulation in the case of emulsion polymerization, or in the course of compounding thereof, but rather acids metered in separately. They are added to the nitrile rubber after the production thereof. This avoids partial crosslinking or partial gelation as early as in the course of production of the nitrile rubber.

Nitrile Rubber Containing Epoxy Groups:

The optionally fully or partly hydrogenated nitrile rubbers (i) containing epoxy groups used in the inventive vulcanizable compositions may be any suitable optionally fully or partly hydrogenated nitrile rubbers which have repeat units derived from at least one conjugated diene, at least one α,β-unsaturated nitrile and optionally one or more further copolymerizable monomers, but not from a nonconjugated cyclic polyene, and contain epoxy groups.

The epoxy groups can either be applied to the nitrile rubber by subsequent grafting of compounds containing epoxy groups, or else can be derived from repeat units of a monomer containing epoxy groups additionally used in the production of the nitrile rubber.

Preference is given to using, in the inventive vulcanizable composition, those optionally fully or partly hydrogenated nitrile rubbers containing epoxy groups and comprising repeat units of at least one nitrile, of at least one conjugated diene, of at least one monomer containing epoxy groups, and optionally of one or more further copolymerizable monomers, but not from a nonconjugated cyclic polyene.

The nitrile rubbers containing epoxy groups are typically produced by polymerizing the aforementioned monomers together to produce the nitrile rubber containing epoxy groups. This does not give a graft rubber which has been grafted with monomers containing epoxy groups, but rather a rubber in which the monomer containing epoxy groups has been incorporated into the polymer backbone in the form of repeat units in the course of polymerization.

The monomer containing epoxy groups is thus a monomer which contains epoxy groups, typically comprises at least one C=C double bond and hence is unsaturated, and which is incorporated into the polymer backbone by polymerization via the C=C double bond.

The monomers which contain epoxy groups and are used to produce the nitrite rubbers containing epoxy groups preferably have the general formula (I)

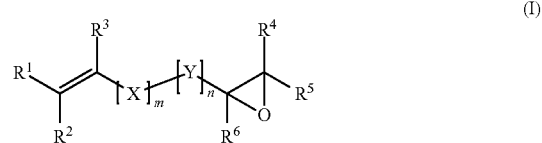

in which m is 0 or 1,

X is O, O(CR$_2$)$_p$, (CR$_2$)$_p$O, C(=O)O, C(=O)O(CR$_2$)$_p$, C(=O)NR, (CR$_2$)$_p$, N(R), N(R)(CR$_2$)$_p$, P(R), P(R)(CR$_2$)$_p$, P(=O)(R), P(=O)(R)(CR$_2$)$_p$, S, S(CR$_2$)$_p$, S(=O)(CR$_2$)$_p$, S(=O)$_2$(CR$_2$)$_p$ or S(=O)$_2$, where R in these radicals is the same or different and may be as defined for R$^1$-R$^6$, Y represents repeat units of one or more mono- or polyunsaturated monomers, comprising conjugated or nonconjugated dienes, alkynes and vinyl compounds, or a structural element which derives from polymers comprising polyethers, especially polyalkylene glycol ethers and polyalkylene oxides, polysiloxanes, polyols, polycarbonates, polyurethanes, polyisocyanates, polysaccharides, polyesters and polyamides, n and p are the same or different and are each in the range from 0 to 10 000, R, R$^1$, R$^2$, R$^3$, R$^4$, R$^5$ and R$^6$ are the same or different and are each H, a linear or branched, saturated or mono- or polyunsaturated alkyl radical, a saturated or mono- or polyunsaturated carbo- or heterocyclyl radical, aryl, heteroaryl, arylalkyl, heteroarylalkyl, alkoxy, aryloxy, heteroaryloxy, amino, amido, carbamoyl, alkylthio, arylthio, sulphanyl, thiocarboxyl, sulphinyl, sulphono, sulphino, sulpheno, sulphonic acids, sulphamoyl, hydroxyimino, alkoxycarbonyl, F, Cl, Br, I, hydroxyl, phosphonato, phosphinato, silyl, silyloxy, nitrite, borates, selenates, carbonyl, carboxyl, oxycarbonyl, oxysulphonyl, oxo, thioxo, epoxy, cyanates, thiocyanates, isocyanates, thioisocyanates or isocyanides.

Optionally, the definitions given for the R, $R^1$ to $R^6$ radicals and the repeat units Y of the general formula (I) are each mono- or polysubstituted.

The following radicals from the definitions for R, $R^1$ to $R^6$ preferably have such mono- or polysubstitution: alkyl, carbocyclyl, heterocyclyl, aryl, heteroaryl, arylalkyl, heteroarylalkyl, alkoxy, aryloxy, alkylthio, arylthio, amino, amido, carbamoyl, F, Cl, Br, I, hydroxyl, phosphonato, phosphinato, sulphanyl, thiocarboxyl, sulphinyl, sulphono, sulphino, sulpheno, sulphamoyl, silyl, silyloxy, carbonyl, carboxyl, oxycarbonyl, oxysulphonyl, oxo, thioxo, borates, selenates and epoxy. Useful substituents include—provided that chemically stable compounds are the result—all definitions that R can assume. Particularly suitable substituents are alkyl, carbocyclyl, aryl, halogen, preferably fluorine, chlorine, bromine or iodine, nitrile (CN) and carboxyl.

Particular preference is given to using a monomer which contains epoxy groups and is of the general formula (I) in which X, R, $R^1$ to $R^6$ and m are each as defined above for the general formula (I), p and n are the same or different and are each in the range from 0 to 100.

Especially preferably, X, R, $R^1$ to $R^6$ and in are each as defined above for the general formula (I) and p is in the range from 0 to 100 and n is zero. This monomer containing epoxy groups thus has the general structure (Ia)

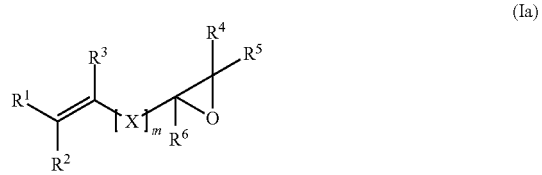

in which
X, R, $R^1$ to $R^6$, m and p are each as defined above for the general formula (I).

Especially preferably, a monomer is used which contains epoxy groups and is of the general formula (I), in which X, R and $R^1$ to $R^6$ are each as defined above for the general formula (I), m is 1, p is 1 and n is zero.

Preferred examples of monomers containing epoxy groups are 2-ethylglycidyl acrylate, 2-ethylglycidyl methacrylate, 2-(n-propyl)glycidyl acrylate, 2-(n-propyl)glycidyl methacrylate, 2-(n-butyl)glycidyl acrylate, 2-(n-butyl)glycidyl methacrylate, glycidyl methacrylate, glycidylmethyl methacrylate, glycidyl acrylate, (3',4'-epoxyheptyl)-2-ethyl acrylate, (3',4'-epoxyheptyl)-2-ethyl methacrylate, 6',7'-epoxyheptyl acrylate, 6',7'-epoxyheptyl methacrylate, allyl glycidyl ether, allyl 3,4-epoxyheptyl ether, 6,7-epoxyheptyl allyl ether, vinyl glycidyl ether, vinyl 3,4-epoxyheptyl ether, 3,4-epoxyheptyl vinyl ether, 6,7-epoxyheptyl vinyl ether, o-vinylbenzyl glycidyl ether, m-vinylbenzyl glycidyl ether, p-vinylbenzyl glycidyl ether, 3-vinylcyclohexene oxide.

The monomer containing epoxy groups used is preferably a glycidyl(alkyl)acrylate. Particular preference is given to using glycidyl acrylate or glycidyl methacrylate.

In a preferred embodiment, the inventive vulcanizable composition comprises
(i) at least one optionally fully or partly hydrogenated nitrite rubber containing epoxy groups and comprising repeat units derived from at least one conjugated diene, at least one α,β-unsaturated nitrite, at least one monomer which contains epoxy groups and is selected from the group consisting of 2-ethylglycidyl acrylate, 2-ethylglycidyl methacrylate, 2-(n-propyl)glycidyl acrylate, 2-(n-propyl)glycidyl methacrylate, 2-(n-butyl)glycidyl acrylate, 2-(n-butyl)glycidyl methacrylate, glycidyl methacrylate, glycidylmethyl methacrylate, glycidyl acrylate, (3',4'-epoxyheptyl)-2-ethyl acrylate, (3',4'-epoxyheptyl)-2-ethyl methacrylate, 6',7'-epoxyheptyl acrylate, 6',7'-epoxyheptyl methacrylate, allyl glycidyl ether, allyl 3,4-epoxyheptyl ether, 6,7-epoxyheptyl allyl ether, vinyl glycidyl ether, vinyl 3,4-epoxyheptyl ether, 3,4-epoxyheptyl vinyl ether, 6,7-epoxyheptyl vinyl ether, o-vinylbenzyl glycidyl ether, m-vinylbenzyl glycidyl ether, p-vinylbenzyl glycidyl ether and 3-vinylcyclohexene oxide, and optionally one or more further copolymerizable monomers, but not from a nonconjugated cyclic polyene, and
(ii) at least one Lewis acid selected from the group consisting of boron trifluoride, aluminium trichloride, indium (III) chloride, zinc chloride, zinc oxide, iron(II) oxide, iron(III) oxide, iron(III) chloride, silicon tetrachloride, lithium bromide, lithium chloride, magnesium oxide, magnesium chloride, scandium(III) triflate, rhodium(III) chloride and/or a Brønsted acid selected from the group consisting of potassium hydrogensulphate, ammonium hydrogensulphate, tetraalkylammonium hydrogensulphate, especially tetra-n-butylammonium hydrogensulphate, potassium dihydrogenphosphate, disodium hydrogenphosphate, sodium dihydrogenphosphate, ammonium chloride, ammonium sulphate, ammonium carbonate, ammonium hydroxide, ammonium acetate, dodecylbenzylsulphonic acid, p-toluenesulphonic acid, ascorbic acid, acetic acid, acrylic acid, fumaric acid, maleic acid, benzoic acid, abietic acid, saturated and unsaturated fatty acids, especially stearic acid and oleic acid, or a buffer mixture comprising the latter, as a crosslinker,
said vulcanizable composition comprising crosslinkers other than those specified under (ii) only in an amount of less than 2.5 parts by weight, based on 100 parts by weight of the optionally fully or partly hydrogenated nitrite rubber (i) containing epoxy groups.

In a particularly preferred embodiment, the inventive vulcanizable composition comprises
(i) at least one optionally fully or partly hydrogenated nitrile rubber containing epoxy groups and comprising repeat units derived from at least one conjugated diene, at least one α,β-unsaturated nitrite, from glycidyl acrylate and/or glycidyl methacrylate, and optionally one or more further copolymerizable monomers, but not from a nonconjugated cyclic polyene, and
(ii) at least one Lewis acid selected from the group consisting of aluminium trichloride, zinc chloride, zinc oxide, iron(II) oxide, iron(III) oxide, iron(III) chloride, lithium chloride, magnesium oxide, magnesium chloride, or Brønsted acid selected from the group consisting of potassium hydrogensulphate, ammonium hydrogensulphate, tetra-n-butylammonium hydrogensulphate, dodecylbenzylsulphonic acid, p-toluenesulphonic acid, ascorbic acid, stearic acid and oleic acid, or a buffer mixture comprising the latter, as a crosslinker,
said vulcanizable composition comprising crosslinkers other than those specified under (ii) only in an amount of less than 2.5 parts by weight, based on 100 parts by weight of the optionally fully or partly hydrogenated nitrile rubber (i) containing epoxy groups.

Any conjugated diene may be present in the nitrile rubber containing epoxy groups. Preference is given to using ($C_4$-$C_6$) conjugated dienes. Particular preference is given to 1,2-butadiene, 1,3-butadiene, isoprene, 2,3-dimethylbutadiene, piperylene or mixtures thereof. Especially preferred are 1,3-butadiene and isoprene or mixtures thereof. Even more preferred is 1,3-butadiene.

The α,β-unsaturated nitrile used may be any known α,β-unsaturated nitrile, preference being given to ($C_3$-$C_5$)-α,β-unsaturated nitriles such as acrylonitrile, methacrylonitrile, ethacrylonitrile or mixtures thereof. Particular preference is given to acrylonitrile.

The further copolymerizable monomers used—if desired—may be, for example, aromatic vinyl monomers, preferably styrene, α-methylstyrene and vinylpyridine, fluorinated vinyl monomers, preferably fluoroethyl vinyl ether, fluoropropyl vinyl ether, o-fluoromethylstyrene, vinyl pentafluorobenzoate, difluoroethylene and tetrafluoroethylene, or else copolymerizable antiageing monomers, preferably N-(4-anilinophenyl)acrylamide, N-(4-anilinophenyl)methacrylamide, N-(4-anilinophenyl)cinnamide, N-(4-anilinophenyl)crotonamide, N-phenyl-4-(3-vinylbenzyloxy)aniline and N-phenyl-4-(4-vinylbenzyloxy)aniline, and also non-conjugated dienes, such as 4-cyanocyclohexene and 4-vinylcyclohexene, or else alkynes, such as 1- or 2-butyne.

In addition, the copolymerizable termonomers may be monomers containing hydroxyl groups, preferably hydroxyalkyl (meth)acrylates. It is also possible to use correspondingly substituted (meth)acrylamides.

Examples of suitable hydroxyalkyl acrylate monomers are 2-hydroxyethyl (meth)acrylate, 2-hydroxypropyl (meth)acrylate, 3-hydroxypropyl (meth)acrylate, 3-chloro-2-hydroxypropyl (meth)acrylate, 3-phenoxy-2-hydroxypropyl (meth)acrylate, glyceryl mono(meth)acrylate, hydroxybutyl (meth)acrylate, 3-chloro-2-hydroxypropyl (meth)acrylate, hydroxyhexyl (meth)acrylate, hydroxyoctyl (meth)acrylate, hydroxymethyl(meth)acrylamide, 2-hydroxypropyl (meth)acrylate, 3-hydroxypropyl(meth)acrylamide, di(ethylene glycol) itaconate, di(propylene glycol) itaconate, bis(2-hydroxypropyl) itaconate, bis(2-hydroxyethyl) itaconate, bis (2-hydroxyethyl) fumarate, bis(2-hydroxyethyl) maleate and hydroxymethyl vinyl ketone.

Alternatively, further copolymerizable monomers used may be copolymerizable termonomers containing carboxyl groups, for example α,β-unsaturated monocarboxylic acids, esters thereof, α,β-unsaturated dicarboxylic acids, mono- or diesters thereof or the corresponding anhydrides or amides thereof.

The α,β-unsaturated monocarboxylic acids used may preferably be acrylic acid and methacrylic acid.

It is also possible to use esters of the α,β-unsaturated monocarboxylic acids, preferably the alkyl esters and alkoxyalkyl esters thereof. Preference is given to the alkyl esters, especially $C_1$-$C_{18}$ alkyl esters, of the α,β-unsaturated monocarboxylic acids, particular preference to alkyl esters, especially $C_1$-$C_{18}$ alkyl esters of acrylic acid or of methacrylic acid, especially methyl acrylate, ethyl acrylate, propyl acrylate, n-butyl acrylate, tert-butyl acrylate, 2-ethylhexyl acrylate, n-dodecyl acrylate, methyl methacrylate, ethyl methacrylate, butyl methacrylate and 2-ethylhexyl methacrylate. Preference is also given to alkoxyalkyl esters of the α,β-unsaturated monocarboxylic acids, particular preference to alkoxyalkyl esters of acrylic acid or of methacrylic acid, especially $C_2$-$C_{12}$-alkoxyalkyl esters of acrylic acid or of methacrylic acid, even more preferably methoxymethyl acrylate, methoxyethyl (meth)acrylate, ethoxyethyl (meth)acrylate and methoxyethyl (meth)acrylate. It is also possible to use mixtures of alkyl esters, for example those mentioned above, with alkoxyalkyl esters, for example in the form of those mentioned above. It is also possible to use cyanoalkyl acrylates and cyanoalkyl methacrylates in which the number of carbon atoms in the cyanoalkyl group is 2-12, preferably α-cyanoethyl acrylate, β-cyanoethyl acrylate and cyanobutyl methacrylate. It is also possible to use hydroxyalkyl acrylates and hydroxyalkyl methacrylates in which the number of carbon atoms of the hydroxyalkyl groups is 1-12, preferably 2-hydroxyethyl acrylate, 2-hydroxyethyl methacrylate and 3-hydroxypropyl acrylate; it is also possible to use acrylates or methacrylates containing fluorine-substituted benzyl groups, preferably fluorobenzyl acrylate and fluorobenzyl methacrylate. It is also possible to use acrylates or methacrylates containing fluoroalkyl groups, preferably trifluoroethyl acrylate and tetrafluoropropyl methacrylate. It is also possible to use α,β-unsaturated carboxylic esters containing amino groups, such as dimethylaminomethyl acrylate and diethylaminoethyl acrylate.

Further copolymerizable monomers used may additionally be α,β-unsaturated dicarboxylic acids, preferably maleic acid, fumaric acid, crotonic acid, itaconic acid, citraconic acid and mesaconic acid.

It is additionally possible to use α,β-unsaturated dicarboxylic anhydrides, preferably maleic anhydride, itaconic anhydride, citraconic anhydride and mesaconic anhydride.

It is additionally possible to use mono- or diesters of α,β-unsaturated dicarboxylic acids.

These α,β-unsaturated dicarboxylic mono- or diesters may, for example, be alkyl, preferably $C_1$-$C_{10}$-alkyl, especially ethyl, n-propyl, isopropyl, n-butyl, tert-butyl, n-pentyl or n-hexyl, alkoxyalkyl, preferably $C_2$-$C_{12}$-alkoxyalkyl, more preferably $C_3$-$C_8$-alkoxyalkyl, hydroxyalkyl, preferably $C_1$-$C_{12}$-hydroxyalkyl, more preferably $C_2$-$C_8$-hydroxyalkyl, cycloalkyl, preferably $C_5$-$C_{12}$-cycloalkyl, more preferably $C_6$-$C_{12}$-cycloalkyl, alkylcycloalkyl, preferably $C_6$-$C_{12}$-alkylcycloalkyl, more preferably $C_7$-$C_{10}$-alkylcycloalkyl, aryl, preferably $C_6$-$C_{14}$-aryl mono- or diesters, where the diesters in each case may also be mixed esters.

Particularly preferred alkyl esters of α,β-unsaturated monocarboxylic acids are methyl (meth)acrylate, ethyl (meth)acrylate, propyl (meth)acrylate, n-butyl (meth)acrylate, t-butyl (meth)acrylate, hexyl (meth)acrylate, 2-ethylhexyl (meth)acrylate, octyl (meth)acrylate, 2-propylheptyl acrylate and lauryl (meth)acrylate. In particular, n-butyl acrylate is used.

Particularly preferred alkoxyalkyl esters of the α,β-unsaturated monocarboxylic acids are methoxyethyl (meth)acrylate, ethoxyethyl (meth)acrylate and methoxyethyl (meth)acrylate. In particular, methoxyethyl acrylate is used.

Other esters of the α,β-unsaturated monocarboxylic acids used are additionally, for example, polyethylene glycol (meth)acrylate, polypropylene glycol (meth)acrylate, N-(2-hydroxyethypacrylamide, N-(2-hydroxymethyl)acrylamide and urethane (meth)acrylate.

Examples of α,β-unsaturated dicarboxylic monoesters include monoalkyl maleates, preferably monomethyl maleate, monoethyl maleate, monopropyl maleate and mono-n-butyl maleate;

monocycloalkyl maleates, preferably monocyclopentyl maleate, monocyclohexyl maleate and monocycloheptyl maleate;

monoalkylcycloalkyl maleates, preferably monomethylcyclopentyl maleate and monoethylcyclohexyl maleate;

monoaryl maleates, preferably monophenyl maleate;
monobenzyl maleates, preferably monobenzyl maleate;
monoalkyl fumarates, preferably monomethyl fumarate, monoethyl fumarate, monopropyl fumarate and mono-n-butyl fumarate;
monocycloalkyl fumarates, preferably monocyclopentyl fumarate, monocyclohexyl fumarate and monocycloheptyl fumarate;
monoalkylcycloalkyl fumarates, preferably monomethylcyclopentyl fumarate and monoethylcyclohexyl fumarate;
monoaryl fumarates, preferably monophenyl fumarate;
monobenzyl fumarates, preferably monobenzyl fumarate;
monoalkyl citraconates, preferably monomethyl citraconate, monoethyl citraconate, monopropyl citraconate and mono-n-butyl citraconate;
monocycloalkyl citraconates, preferably monocyclopentyl citraconate, monocyclohexyl citraconate and monocycloheptyl citraconate;
monoalkylcycloalkyl citraconates, preferably monomethylcyclopentyl citraconate and monoethylcyclohexyl citraconate;
monoaryl citraconates, preferably monophenyl citraconate;
monobenzyl citraconates, preferably monobenzyl citraconate;
monoalkyl itaconates, preferably monomethyl itaconate, monoethyl itaconate, monopropyl itaconate and mono-n-butyl itaconate;
monocycloalkyl itaconates, preferably monocyclopentyl itaconate, monocyclohexyl itaconate and monocycloheptyl itaconate;
monoalkylcycloalkyl itaconates, preferably monomethylcyclopentyl itaconate and monoethylcyclohexyl itaconate;
monoaryl itaconates, preferably monophenyl itaconate;
monobenzyl itaconates, preferably monobenzyl itaconate;
monoalkyl mesaconates, preferably monoethyl mesaconate.

The α,β-unsaturated dicarboxylic diesters used may be the analogous diesters based on the aforementioned monoester groups, where the ester groups may also be chemically different groups.

Useful further copolymerizable monomers are additionally free-radically polymerizable compounds containing at least two olefinic double bonds per molecule. Examples of polyunsaturated compounds are acrylates, methacrylates or itaconates of polyols, for example ethylene glycol diacrylate, diethylene glycol dimethacrylate, triethylene glycol diacrylate, butanediol 1,4-diacrylate, propane-1,2-diol diacrylate, butane-1,3-diol dimethacrylate, neopentyl glycol diacrylate, trimethylolpropane di(meth)acrylate, trimethylolethane di(meth)acrylate, glyceryl di- and triacrylate, pentaerythrityl di-, tri- and tetraacrylate or -methacrylate, dipentaerythrityl tetra-, penta- and hexaacrylate or -methacrylate or -itaconate, sorbityl tetraacrylate, sorbityl hexamethacrylate, diacrylates or dimethacrylates of 1,4-cyclohexanediol, 1,4-dimethylolcyclohexane, 2,2-bis(4-hydroxyphenyl)propane, of polyethylene glycols or of oligoesters or oligourethanes with terminal hydroxyl groups. The polyunsaturated monomers used may also be acrylamides, for example methylenebisacrylamide, hexamethylene-1,6-bisacrylamide, diethylenetriaminetrismethacrylamide, bis(methacrylamidopropoxy)ethane or 2-acrylamidoethyl acrylate.

Examples of polyunsaturated vinyl and allyl compounds are divinylbenzene, ethylene glycol divinyl ether, diallyl phthalate, allyl methacrylate, diallyl maleate, triallyl isocyanurate or triallyl phosphate.

In a preferred embodiment, the inventive vulcanizable composition comprises
(i) at least one optionally fully or partly hydrogenated nitrile rubber containing epoxy groups and comprising repeat units derived from a) acrylonitrile, b) 1,3-butadiene, c) glycidyl acrylate and/or glycidyl methacrylate, and d) optionally one or more further copolymerizable monomers, but not from a nonconjugated cyclic polyene,
(ii) at least one Lewis acid selected from the group consisting of aluminium trichloride, zinc chloride, zinc oxide, iron(II) oxide, iron(III) oxide, iron(III) chloride, lithium chloride, magnesium oxide, magnesium chloride, or a Brønsted acid selected from the group consisting of potassium hydrogensulphate, ammonium hydrogensulphate, tetra-n-butylammonium hydrogensulphate, dodecylbenzylsulphonic acid, p-toluenesulphonic acid, ascorbic acid, stearic acid and oleic acid, or a buffer mixture comprising the latter, as a crosslinker,
said vulcanizable composition comprising crosslinkers other than those specified under (ii) only in an amount less than 2.5 parts by weight, based on 100 parts by weight of the optionally fully or partly hydrogenated nitrile rubber (1) containing epoxy groups.

Ratios of the Monomers:

The proportions of the respective monomers in the optionally fully or partly hydrogenated nitrile rubbers which contain epoxy groups and are to be used in accordance with the invention can vary within wide ranges.

The proportion of, or of the sum of, the conjugated diene(s) is typically in the range from 39.75 to 90% by weight, preferably in the range from 44 to 88% by weight, more preferably 45.75 to 87% and especially 47.5 to 85% by weight, based on the overall nitrile rubber.

The proportion of, or of the sum of, the α,β-unsaturated nitrile(s) is typically 5 to 60% by weight, preferably 10 to 55% by weight, more preferably 13 to 53% by weight and especially 15 to 51% by weight, based on overall nitrile rubber.

The proportion of monomers containing epoxy groups is preferably 0.25 to 35% by weight, more preferably 1 to 35% by weight, more preferably greater than 2 to 35% by weight, even more preferably 2.25 to 30% by weight, especially 2.5 to 25% by weight, especially preferably 2.7 to 22.5% by weight, very especially preferably 2.7 to 20% by weight and even more especially preferably 2.7 to 12.5% by weight, based on overall nitrile rubber.

The proportions of all monomers must in each case add up to 100% by weight.

The amount of monomer containing epoxy groups in the nitrile rubber (i), the amount of crosslinker (ii) and the ratio of epoxy groups to crosslinker (ii) is set according to the desired degree of crosslinking. By setting the ratio of epoxy groups to the amount of crosslinker (ii), it is possible to adjust the elongation at break and tensile strength to the particular requirements.

The optional further copolymerizable monomers may, according to their nature, be present in amounts of 0 to 50% by weight, based on the overall nitrile rubber (i). In this case, corresponding proportions of the conjugated diene(s) and/or of the α,β-unsaturated nitrile(s) and/or of the monomer containing epoxy groups may be replaced by the proportions of the additional monomers, where the proportions of all monomers must again in each case add up to 100% by weight.

The preparation of such optionally fully or partly hydrogenated nitrile rubbers containing epoxy groups is sufficiently well-known to those skilled in the art. The nitrile rubber containing epoxy groups is typically prepared by what is called an emulsion polymerization. This is conducted in the presence of emulsifiers, which are typically water-soluble salts of anionic emulsifiers or else uncharged emulsifiers. In addition, polymerization is frequently effected in the presence of what are called molecular weight regulators, which are generally alkyl thiols containing 12-16 carbon atoms, preferably tert-dodecyl mercaptans (t-DDM). Such alkyl thiols or (isomer) mixtures of alkyl thiols are either commercially available or else are preparable by processes sufficiently well-described in the literature for the person skilled in the art.

To conduct the polymerization, all or individual components of the initiator system are metered in at the start of the polymerization and/or during the polymerization. Addition of all and individual components in portions during the polymerization is preferred. Sequential addition can be used to control the reaction rate. To achieve homogeneous running of the polymerization, only a portion of the initiator system is used for the start of the polymerization and the rest is metered in during the polymerization. Typically, the polymerization is commenced with 10 to 80% by weight, preferably 30-50% by weight, of the total amount of initiator. It is also possible to meter in individual constituents of the initiator system. If the intention is to prepare chemically homogeneous products, the monomers are metered in. Acrylonitrile and butadiene in particular are metered in if the composition is outside the azeotropic butadiene/acrylonitrile ratio. Preference is given to metered addition in the case of NBR types with acrylonitrile contents of 10 to 34% by weight, and in the case of the types with 40 to 50% by weight of acrylonitrile (W. Hofmann, Rubber Chem. Technol. 36 (1963). The polymerization time is in the range from 5 h to 15 h and depends on factors including the acrylonitrile content of the monomer mixture and on the polymerization temperature. The latter is in the range from 0 to 30° C., preferably in the range from 5 to 25° C. On attainment of conversions in the range from 50 to 90%, preferably in the range from 60 to 85%, the polymerization is ended, typically by adding a commonly known stopper. The amount of water used in the polymerization is in the range from 100 to 900 parts by weight, preferably in the range from 120 to 500 parts by weight and more preferably in the range from 150 to 400 parts by weight of water, based on 100 parts by weight of the monomer mixture. The polymerization can be performed either continuously or else batchwise in a stirred tank cascade. To remove unconverted monomers and volatile constituents, the "stopped" latex is subjected to a steam distillation. In this case, temperatures in the range from 70° C. to 150° C. are employed, the pressure being reduced in the case of temperatures of <100° C. Before the volatile constituents are removed, the latex can be post-stabilized with emulsifier. For this purpose, the aforementioned emulsifiers are appropriately used in amounts of 0.1 to 2.5% by weight, preferably 0.5 to 2.0% by weight, based on 100 parts by weight of nitrile rubber.

In one embodiment, the inventive vulcanizable composition comprises
(i) at least one nitrile rubber containing epoxy groups and comprising repeat units derived from at least one conjugated diene, at least one α,β-unsaturated nitrile, at least one monomer containing epoxy groups and optionally one or more further copolymerizable monomers, but not from a nonconjugated cyclic polyene, where the proportion of the monomer containing epoxy groups is greater than 2 and up to 35% by weight, even more preferably 2.25 to 30% by weight, especially 2.5 to 25% by weight, especially preferably 2.7 to 22.5% by weight and very especially preferably 2.7 to 12.5% by weight, based on overall nitrile rubber, and
(ii) greater than 1 to 30 parts by weight, preferably 1.5 to 25 parts by weight, more preferably 2 to 15 parts by weight, based in each case on 100 parts by weight of the nitrile rubber (i), of at least one Lewis and/or Brønsted acid, as a crosslinker,
said vulcanizable composition comprising crosslinkers other than those specified under (ii) only in an amount of less than 2.5 parts by weight, preferably up to an amount of not more than 2.3 parts by weight, more preferably up to an amount of not more than 2 parts by weight, even more preferably up to an amount of less than 1.5 parts by weight, especially up to an amount of not more than 1.25 parts by weight, especially preferably up to an amount of not more than 1 part by weight, very especially preferably up to an amount of not more than 0.5 part by weight and even more especially preferably up to an amount of not more than 0.4 part by weight, based on 100 parts by weight of the nitrile rubber (i) containing epoxy groups.

In this embodiment, the nitrile rubber containing epoxy groups may be fully or partly hydrogenated. Preferably, the nitrile rubber containing epoxy groups, in this embodiment, has exclusively repeat units derived from at least one conjugated diene, at least one α,β-unsaturated nitrile and at least one monomer containing epoxy groups.

Preference is additionally given to an inventive vulcanizable composition comprising
(i) at least one nitrile rubber containing epoxy groups and comprising exclusively repeat units derived from at least one conjugated diene, at least one α,β-unsaturated nitrile and at least one monomer containing epoxy groups, where the proportion of the monomer containing epoxy groups is 2.25 to 30% by weight, based on overall nitrile rubber, and
(ii) 1.5 to 25 parts by weight, based on 100 parts by weight of the nitrile rubber (i), of at least one Lewis and/or Brønsted acid as a crosslinker,
said vulcanizable composition comprising crosslinkers other than those specified under (ii) only in an amount of less than 1.5 parts by weight, more preferably less than 1.25 parts by weight, based on 100 parts by weight of the nitrile rubber (i) containing epoxy groups.

In a further embodiment, the inventive vulcanizable composition comprises
(i) at least one nitrile rubber containing epoxy groups and comprising repeat units derived from a) acrylonitrile, b) 1,3-butadiene, c) glycidyl acrylate and/or glycidyl methacrylate and d) optionally one or more further copolymerizable monomers, but not from a nonconjugated cyclic polyene, where the proportion of the glycidyl acrylate and/or glycidyl methacrylate is greater than 2 and up to 35% by weight, even more preferably 2.25 to 30% by weight, especially 2.5 to 25% by weight, especially preferably 2.7 to 22.5% by weight and very especially preferably 2.7 to 12.5% by weight, based on overall nitrile rubber, and (ii) greater than 1 to 30 parts by weight, preferably 1.5 to 25 parts by weight, more preferably 2 to 15 parts by weight, based in each case on 100 parts by weight of the nitrile rubber (i), of at least one Lewis acid selected from the group consisting of aluminium trichloride, zinc chloride, zinc oxide, iron(II) oxide, iron(III) oxide, iron(III) chloride, lithium chloride, magnesium oxide, magnesium chloride, or Brønsted acid selected from the group consisting of potassium hydrogensulphate, ammonium hydrogensulphate, tetra-n-butylammonium hydrogensulphate, dodecylbenzylsulphonic acid, p-toluenesulphonic acid, ascorbic acid, stearic acid and oleic acid, or a buffer mixture comprising the latter, as a crosslinker,
said vulcanizable composition comprising crosslinkers other than those specified under (ii) only in an amount of less than 2.5 parts by weight, preferably up to an amount of not more than 2.3 parts by weight, more preferably up to an amount of not more than 2 parts by weight, even more preferably up to an amount of less than 1.5 parts by weight, especially up to an amount of not more than 1.25 parts by weight, especially preferably up to an amount of not more than 1 part by weight, very especially preferably up to an amount of not more than 0.5 part by weight and even more especially preferably up to an amount of not more than 0.4 part by weight, based on 100 parts by weight of the nitrile rubber (i) containing epoxy groups.

In this further embodiment too, the nitrile rubber containing epoxy groups may be fully or partly hydrogenated. The nitrile rubber containing epoxy groups preferably has exclusively repeat units derived from a) acrylonitrile, h) 1,3-butadiene and c) glycidyl acrylate and/or glycidyl methacrylate.

Preference is given to this further inventive vulcanizable composition comprising
(i) at least one nitrile rubber containing epoxy groups and comprising exclusively repeat units derived from a) acrylonitrile, b) 1,3-butadiene, c) glycidyl acrylate and/or glycidyl methacrylate, where the proportion of glycidyl acrylate and/or glycidyl methacrylate is 2.25 to 30% by weight, based on overall nitrile rubber, and
(ii) 1.5 to 25 parts by weight, based on 100 parts by weight of the nitrile rubber (i), of at least one Lewis and/or Brønsted acid as a crosslinker,
said vulcanizable composition comprising crosslinkers other than those specified under (ii) only in an amount of less than 1.5 parts by weight, more preferably less than 1.25 parts by weight, based on 100 parts by weight of the nitrile rubber (i) containing epoxy groups.

Metathesis and Hydrogenation:

It is also possible that the preparation of the nitrile rubber (a) containing epoxy groups is followed by a metathesis reaction to reduce the molecular weight of the nitrile rubber or (b) a metathesis reaction and a subsequent hydrogenation or (c) only a hydrogenation. These metathesis or hydrogenation reactions are sufficiently well-known to those skilled in the art and are described in the literature. Metathesis is known, for example, from WO-A-02/100941 and WO-A-02/100905 and can be used to reduce the molecular weight.

The hydrogenation can be performed using homogeneous or heterogeneous hydrogenation catalysts. The catalysts used are based typically on rhodium, ruthenium or titanium, but it is also possible to use platinum, iridium, palladium, rhenium, ruthenium, osmium, cobalt or copper, either as the metal or else preferably in the form of metal compounds (see, for example, U.S. Pat. No. 3,700,637, DE-A-25 39 132, EP-A-0 134 023, DE-A-35 41 689, DE-A-35 40 918, EP-A-0 298 386, DE-A-35 29 252, DE-A-34 33 392, U.S. Pat. No. 4,464,515 and U.S. Pat. No. 4,503,196).

Suitable catalysts and solvents for a hydrogenation in homogeneous phase are described hereinafter and are also known from DE-A-25 39 132 and EP-A-0 471 250. The selective hydrogenation can be achieved, for example, in the presence of a rhodium or ruthenium catalyst. It is possible to use, for example, a catalyst of the general formula

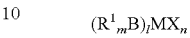

$(R^1{}_m B)_l M X_n$ in which M is ruthenium or rhodium, $R^1$ is the same or different and is a $C_1$-$C_8$ alkyl group, a $C_4$-$C_8$ cycloalkyl group, a $C_6$-$C_{15}$ aryl group or a $C_7$-$C_{15}$ aralkyl group. B is phosphorus, arsenic, sulphur or a sulphoxide group S=O. X is hydrogen or an anion, preferably halogen and more preferably chlorine or bromine, l is 2, 3 or 4, m is 2 or 3 and n is 1, 2 or 3, preferably 1 or 3. Preferred catalysts are tris(triphenylphosphine)rhodium(I) chloride, tris(triphenylphosphine)rhodium(III) chloride and tris(dimethyl sulphoxide)rhodium(III) chloride, and also tetrakis(triphenylphosphine)rhodium hydride of the formula $(C_6H_5)_3P)_4RhH$ and the corresponding compounds in which the triphenylphosphine has been replaced fully or partly by tricyclohexylphosphine. The catalyst can be used in small amounts. An amount in the range of 0.01-1% by weight, preferably in the range of 0.03-0.5% by weight and more preferably in the range of 0.1-0.3% by weight, based on the weight of the polymer, is suitable.

It is typically advisable to use the catalyst together with a cocatalyst which is a ligand of the formula $R^1{}_m B$ where $R^1$, m and B are each as defined above for the catalyst. Preferably, m is 3, B is phosphorus and the $R^1$ radicals may be the same or different. The cocatalysts preferably have trialkyl, tricycloalkyl, triaryl, triaralkyl, diaryl monoalkyl, diaryl monocycloalkyl, dialkyl monoaryl, dialkyl monocycloalkyl, dicycloalkyl monoaryl or dicyclalkyl monoaryl radicals.

Examples of cocatalysts can be found, for example, in U.S. Pat. No. 4,631,315. A preferred cocatalyst is triphenylphosphine. The cocatalyst is used preferably in amounts within a range of 0.3-5% by weight, preferably in the range of 0.5-4% by weight, based on the weight of the nitrile rubber to be hydrogenated. Preferably, in addition, the weight ratio of the rhodium catalyst to the cocatalyst is in the range from 1:3 to 1:55, more preferably in the range from 1:5 to 1:45, based on 100 parts by weight of the nitrile rubber to be hydrogenated; preferably 0.1 to 33 parts by weight of the cocatalyst, more preferably 0.5 to 20 and even more preferably 1 to 5 parts by weight, especially more than 2 but less than 5 parts by weight, based on 100 parts by weight of the nitrile rubber to be hydrogenated, are used.

The practical conduct of the hydrogenation is known to those skilled in the art from U.S. Pat. No. 6,683,136. It is effected typically by contacting the nitrile rubber to be hydrogenated with hydrogen in a solvent such as toluene or monochlorobenzene at a temperature in the range from 100 to 150° C. and a pressure in the range from 50 to 150 bar for 2 to 10 h.

Hydrogenation is understood in the context of this invention to mean a conversion of the double bonds present in the starting nitrile rubber to an extent of at least 50%, preferably 70-100%, more preferably 80-100%. The determination of the degree of hydrogenation is well-known to those skilled in the art and can be effected, for example, by Raman or IR spectroscopy (see, for example, EP-A-0 897 933 for the determination by Raman spectroscopy or U.S. Pat. No. 6,522,408 for the determination via IR spectroscopy).

In the case of use of heterogeneous catalysts, these are typically supported catalysts based on palladium, which are supported, for example, on charcoal, silica, calcium carbonate or barium sulphate.

Fully or partly hydrogenated nitrile rubbers containing epoxy groups are not known to date. The invention thus also provides fully or partly hydrogenated nitrile rubbers containing epoxy groups and having repeat units derived from at least one conjugated diene, at least one α,β-unsaturated nitrile and optionally one or more further copolymerizable monomers, but not from a nonconjugated cyclic polyene.

The inventive optionally fully or partly hydrogenated nitrile rubbers containing epoxy groups typically have Mooney viscosities (ML (1+4@100° C.)) in the range from 10 to 160, preferably from 15 to 150 Mooney units, more preferably from 20 to 150 Mooney units and especially 25 to 145 Mooney units. The values of the Mooney viscosity (ML 1+4@100° C.) are determined by means of a shearing disc viscometer to DIN 53523/3 or ASTM D 1646 at 100° C.

The optionally fully or partly hydrogenated nitrile rubbers containing epoxy groups typically additionally have a polydispersity $PDI=M_w/M_n$, where $M_w$ is the weight-average and $M_n$ the number-average molecular weight, in the range from 1.0 to 6.0 and preferably in the range from 1.5 to 5.0.

The glass transition temperatures of the inventive optionally fully or partly hydrogenated nitrile rubbers containing epoxy groups are in the range from −80° C. to +20° C., preferably in the range from −70° C. to +10° C. and more preferably in the range from −60° C. to 0° C.

A preferred embodiment of the invention concerns vulcanizable compositions which additionally comprise (iii) at least one filler. This filler comprises exclusively compounds not already encompassed by the inventive crosslinkers (ii). It is possible to use, for example, carbon black, silica, carbon nanotubes, Teflon (the latter preferably in powder form) or silicates.

In further embodiments, the inventive vulcanizable compositions may also comprise one or more additives familiar to the person skilled in the art of rubber. These too are exclusively compounds not covered by the definition of the inventive crosslinkers (ii). These additives include filler activators, ageing stabilizers, reversion stabilizers, light stabilizers, ozone stabilizers, processing aids, plasticizers, mineral oils, tackifiers, blowing agents, dyes, pigments, waxes, resins, extenders, vulcanization accelerators, and further or other additives known in the rubber industry (Ullmann's Encyclopedia of Industrial Chemistry, VCH Verlagsgesellschaft mbH, D-69451 Weinheim, 1993, vol A 23 "Chemicals and Additives", p. 366-417).

Useful filler activators include, for example, organic silanes, preferably vinyltrimethyloxysilane, vinyldimethoxymethylsilane, vinyltriethoxysilane, vinyltris(2-methoxyethoxy)silane, N-cyclohexyl-3-aminopropyltrimethoxysilane, 3-aminopropyltrimethoxysilane, methyltrimethoxysilane, methyltriethoxysilane, dimethyldimethoxysilane, dimethyldiethoxysilane, trimethylethoxysilane, isooctyltrimethoxysilane, isooetyltriethoxysilane, hexadecyltrimethoxysilane or (octadecyl)methyldimethoxysilane. Further filler activators are, for example, interface-active substances such as triethanolamine, trimethylolpropane, hexanetriol, and polyethylene glycols with molecular weights of 74 to 10 000 g/mol. The amount of filler activators is typically 0 to 10 parts by weight, based on 100 parts by weight of the optionally fully or partly hydrogenated nitrile rubber containing epoxide groups.

The ageing stabilizers which may be added to the vulcanizable compositions may be any of those known to those skilled in the art, which are used typically in amounts of 0 to 5 parts by weight, preferably 0.5 to 3 parts by weight, based on 100 parts by weight of the optionally hydrogenated nitrile rubber containing epoxide groups.

Useful mould release agents include, for example, saturated or partly unsaturated fatty acids and oleic acids and derivatives thereof (fatty acid esters, fatty acid salts, fatty alcohols, fatty acid amides). In addition, it is possible to use products applicable to the mould surface, for example products based on low molecular weight silicone compounds, products based on fluoropolymers and products based on phenol resins. The mould release agents are used in amounts of 0 to 10 parts by weight, preferably 0.5 to 5 parts by weight, based on 100 parts by weight of the optionally hydrogenated nitrile rubber containing epoxide groups.

Another possibility is reinforcement with strengthening agents (fibres) made of glass, according to the teaching of U.S. Pat. No. 4,826,721, and another is reinforcement by cords, woven fabrics, fibres made of aliphatic and aromatic polyamides (Nylon®, Aramid®), polyesters and natural fibre products.

The invention further provides the process for producing the vulcanizable compositions by mixing component (i), i.e. at least one optionally fully or partly hydrogenated nitrile rubber containing epoxy groups, with component (ii), i.e. at least one Lewis and/or Brønsted acid (ii). This mixing operation can be effected in all mixing apparatuses familiar to those skilled in the art. Typically, the crosslinker (ii) is metered into the nitrile rubber (i). When one or more fillers and one or more further rubber additives are used, they can also be mixed in in any desired sequence. In the production of the vulcanizable mixture, the optionally fully or partly hydrogenated nitrile rubber containing epoxy groups is used in solid form. No solvents are present.

The invention further provides a process for producing vulcanizates based on an optionally fully or partly hydrogenated nitrile rubber containing epoxy groups, characterized in that the aforementioned vulcanizable composition is crosslinked with increasing temperature. The crosslinking can be effected at temperatures in the range from preferably 20 to 250° C., more preferably 50 to 230° C. The duration of the crosslinking reaction is in the range from one (1) minute to several days.

The invention also provides the vulcanizates thus obtainable. These exhibit very good values in the compression set test at room temperature, 100° C. and 150° C., and additionally high tensile strength coupled with good elongations at break.

EXAMPLES

The nitrogen content for determination of the acrylonitrile content ("ACN content") in the inventive optionally fully or partly hydrogenated nitrile rubbers containing epoxy groups is determined to DIN 53 625 according to Kjeldahl. Due to the content of polar comonomers, the optionally hydrogenated nitrile rubbers containing epoxy groups are typically >85% by weight soluble in methyl ethyl ketone at 20° C.

The glass transition temperature and what are called the onset and offset points are determined by means of Differential Scanning calorimetry (DSC) to ASTM E 1356-03 or to DIN 11357-2.

The microstructure and the termonomer content of the individual polymers are determined by means of 1H NMR (instrument: Bruker DPX400 with XWIN-NMR 3.1 software, measurement frequency 400 MHz, solvent CDCl3).

The values of the Mooney viscosity (ML 1+4@100° C.) are determined in each case by means of a shearing disc viscometer to DIN 53523/3 or ASTM D 1646 at 100° C. The MSR (Mooney Stress Relaxation) is determined in each case by means of a shearing disc viscometer to ISO 289-4:2003 (E) at 100° C.

The vulcanization profile in the MDR and the analytical data thereof were measured on a Monsanto MDR 2000 rheometer to ASTM D5289-95.

The compression set ("CS") at the temperature specified was measured to DIN 53517.

The Shore A hardness was measured to ASTM-D2240-81.

The tensile tests to determine stress as a function of deformation were conducted to DIN 53504 or ASTM D412-80.

The abbreviations given in the tables below have the following meanings:
"RT" room temperature (23±2° C.)
"TS" tensile strength, measured at RT
"EB" elongation at break, measured at RT
"M50" modulus at 50% elongation, measured at RT
"M100" modulus at 100% elongation, measured at RT
"M300" modulus at 300% elongation, measured at RT
"S min" is the minimum torque of the crosslinking isotherm
"S max" is the maximum torque of the crosslinking isotherm
"delta S" is "S max−S min"
"$t_{10}$" is the time when 10% of S max is attained
"$t_{50}$" is the time when 50% of S max is attained
"$t_{90}$" is the time when 90% of S max is attained
"$t_{95}$" is the time when 95% of S max is attained
"TS2" is the time by which the Mooney viscosity has increased by two units compared to the starting point The Following Substances were Used in the Examples:

The following chemicals were purchased as commercial products from the companies specified in each case, or originate from production plants of the companies specified.

Crosslinker (ii):
ascorbic acid commercial product from Sigma Aldrich Chemie GmbH
Cycat® 600 dodecylbenzylsulphonic acid, 70% solution in isopropanol (commercial product from Cytec Industries Inc.)
Cycat® 4040 para-toluenesulphonic acid (commercial product from Cytec Industries Inc.)
DDBS dodecylbenzylsulphonic acid; 70% solution in isopropanol (commercial product from Sigma Aldrich Chemie GmbH)
$KHSO_4$ potassium hydrogensulphate (commercial product from Sigma Aldrich Chemie GmbH)
sodium ascorbate sodium salt of ascorbic acid (commercial product from Sigma Aldrich Chemie GmbH)
Maglite® DE magnesium oxide (commercial product from HallStar Company)
TBAHS tetrabutylammonium hydrogensulphate (commercial product from Sigma Aldrich Chemie GmbH)
Zinkoxyd Aktiv zinc oxide (commercial product from LANXESS Deutschland GmbH)

Other Substances Used in the Polymerization or in the Vulcanizable Composition:
Corax® N550/30 carbon black (commercial product from Evonik Degussa)
Diplast® TM 8-10/ST trioctyl mellitate (commercial product from Lonza SpA)
Luvomaxx® CDPA p-dicumyldiphenylamine (commercial product from Lehmann & Voss)
Wingstay® 29/Naugawhite mixture: mixture of 25 g of Sorbilene Mix (mixture of Sorbitan esters and ethoxylated sorbitan esters) from Lamberti, 38 g of Nauga-white (2,2'-methylenebis(6-nonyl-p-cresol)) from Chemtura, 125 g of Wingstay® 29 (styrenized diphenylamine) from Eliokem and 63 g of water
"Fe(II)$SO_4$ premix solution" contains 0.986 g of Fe(II)$SO_4$*7 $H_2O$ and 2.0 g of Rongalit®C in 400 g of water
Rongalit® C sodium salt of a sulphinic acid derivative (commercial product from BASF SE)
t-DDM tertiary dodecyl mercaptan (Lanxess Deutschland GmbH)
Texapon® K-12 sodium laurylsulphate (commercial product from Cognis Deutschland GmbH & Co. KG)
Trigonox® NT 50 p-menthane hydroperoxide (commercial product from Akzo-Degussa)
Vulkanox® ZMB2/C5 zinc salt of 4- and 5-methyl-2-mercaptobenzimidazole (commercial product from LANXESS Deutschland GmbH)

I Production of Nitrile Rubbers A, B, C and D

Inventive Examples

Nitrile rubbers A, B, C and D used in the example series which follow were produced according to the base formulation specified in Table 1, with all feedstocks stated in parts by weight based on 100 parts by weight of the monomer mixture. Table 1 also specifies the respective polymerization conditions.

TABLE 1

Production of nitrile rubbers A-D

| Nitrile rubber | A | B | C | D |
|---|---|---|---|---|
| butadiene | 62.25 | 63.5 | 58.5 | 54.5 |
| acrylonitrile | 36.0 | 36.0 | 35.5 | 37 |
| glycidyl methacrylate (GMA) | 1.75 | 3.5 | 6 | 8.5 |
| Total amount of water | 220 | 220 | 220 | 220 |
| Texapon ® K-12 | 2.6 | 2.6 | 2.6 | 2.6 |
| $Na_2SO_4$ | 0.12 | 0.12 | 0.12 | 0.12 |
| pH | 7 | 7 | 7 | 7 |
| t-DDM | 0.54 | 0.54 | 0.54 | 0.56 |
| Trigonox ® NT 50 | 0.02 | 0.02 | 0.02 | 0.02 |
| Fe(II)$SO_4$ premix solution | 0.027 | 0.027 | 0.026 | 0.026 |
| diethylhydroxylamine | 0.2 | 0.2 | 0.2 | 0.2 |
| Wingstay ® 29/Naugawhite | 0.18 | 0.18 | 0.18 | 0.18 |
| Polymerization temperature [° C.] | 8.0 ± 0.5 | 8.0 ± 0.5 | 8.0 ± 0.5 | 8.0 ± 0.5 |
| Polymerization conversion [%] | 80 | 86 | 80 | 85 |
| Polymerization time [h] | 7.5 | 8 | 7 | 7 |

The nitrile rubbers were produced batchwise in a 5 l autoclave with stirrer system. In each of the autoclave batches, 1.25 kg of the monomer mixture and a total amount of water of 2.1 kg were used, as was EDTA in an equimolar amount based on the Fe(II). 1.9 kg of this amount of water were initially charged with the emulsifier in the autoclave and purged with a nitrogen stream. Thereafter, the destabilized monomers and the amount of the t-DDM molecular weight regulator specified in Table 1 were added and the reactor was closed. After the reactor contents had been brought to temperature, the polymerizations were started by the addition of the Fe(II)$SO_4$ premix solution and of para-menthane hydroperoxide (Trigonox® NT50). The course of the polymerization was monitored by gravimetric determinations of conversion. On attainment of the conversions reported in Table 1, the polymerization was stopped by adding an aqueous solution of diethylhydroxylamine. Unconverted monomers and other volatile constituents were removed by means of steam distillation.

The dried NBR rubbers were characterized by the Mooney viscosity, the MSR thereof, the ACN content and the glass transition temperature. The content of the termonomer was determined by $^1$H NMR analysis. The rubbers obtained had the properties reported in Tab. 2.

TABLE 2

Properties of nitrile rubbers A-D containing epoxy groups

| Nitrile rubber | A | B | C | D |
|---|---|---|---|---|
| ACN content (%) | 35.0 | 31.6 | 32.2 | 33.0 |
| Mooney viscosity ML (1 + 4 at 100° C.) (Mu) | 25 | 27 | 31 | 30 |
| MSR (Mu/s) | 0.669 | 0.581 | 0.671 | 0.650 |
| Termonomer incorporated (% by wt.) | 1.2 | 2.7 | 4.7 | 7.2 |
| Glass transition temperature $T_G$ (° C.) | −23.1 | −31.0/−21.6 | −25.1 | −21.9 |

II Production of Vulcanizates of the Nitrile Rubber Terpolymers A, B, C and D

Inventive Examples

Nitrile rubber terpolymers A, B, C and D were used as described below to produce vulcanizates V1 to V17. The constituents of the vulcanizable mixtures are based on 100 parts of rubber and are reported in Tables 3, 7, 11, 15 and 19.

The mixtures were produced in a Banbury Mixer. For this purpose, in each case, the rubber and all additives specified in Tables 3, 7, 11, 15 and 19 were mixed at a maximum temperature of up to 120° C. for a total of 4 minutes. For this purpose, the rubber was initially charged in the mixer, all further additives were added after 1 minute, and after 2 further minutes a reversal step was conducted. After a total of 4 minutes, the rubber was discharged from the mixer. The compound was vulcanized at a temperature of 210° C. for 120 min.

TABLE 3

Composition of the vulcanizable mixtures for vulcanizates V1-V4 (Inventive Examples)

| Vulcanizable mixture for | V1 | V2 | V3 | V4 |
|---|---|---|---|---|
| Polymer C | 100 | 100 | | |
| Polymer D | | | 100 | 100 |
| CORAX ® N 550/30 | 50 | 50 | 50 | 50 |
| DIPLAST ® TM 8-10/ST | 5 | 5 | 5 | 5 |
| LUVOMAXX ® CDPA | 1 | 1 | 1 | 2 |

TABLE 3-continued

Composition of the vulcanizable mixtures for vulcanizates V1-V4 (Inventive Examples)

| Vulcanizable mixture for | | V1 | V2 | V3 | V4 |
|---|---|---|---|---|---|
| VULKANOX ZMB2/C5 | | 0.4 | 0.4 | 0.4 | 0.4 |
| MAGLITE ® DE | | 2 | 2 | 2 | 2 |
| ZINKOXYD ® AKTIV | | 3 | 6 | 3 | 6 |
| Total | phr | 164.4 | 164.4 | 164.4 | 164.4 |
| Density | g/ccm | 1.183 | 1.183 | 1.183 | 1.183 |

The vulcanizates obtained had the properties reported in Tables 4 to 6:

TABLE 4

Vulcanizates V1-V4; vulcanization profile in the MDR (210° C./60 minutes)

| Vulcanizate | V1 | V2 | V3 | V4 |
|---|---|---|---|---|
| S max (dNm) | 22.0 | 27.2 | 17.5 | 27.4 |
| $t_{10}$ (min) | 5.4 | 9.7 | 3.9 | 10.2 |
| $t_{95}$ (min) | 50.1 | 56.9 | 56.2 | 56.9 |

The level of the respective maximum torque is in accordance with the proportions of Lewis acid.

TABLE 5

Vulcanizates V1-V4, properties

| Vulcanizate | | V1 | V2 | V3 | V4 |
|---|---|---|---|---|---|
| Crosslinking temperature | ° C. | 210 | | | |
| Crosslinking time | min | 120 | 120 | 120 | 120 |
| TS | MPa | 19.1 | 22.5 | 18.4 | 20.5 |
| EB | % | 249 | 323 | 206 | 298 |
| M50 | MPa | 3.1 | 2.9 | 3.7 | 2.9 |
| M100 | MPa | 7 | 6.7 | 8.3 | 6.6 |
| M300 | MPa | | 21.3 | | 20.1 |
| Hardness | Shore A | 74 | 72 | 76 | 72 |

The inventive vulcanizates feature high tensile strength and high modulus values at 100% elongation.

TABLE 6

Vulcanizates V1-V4, compression set at RT, 100° C. and 150° C.

| Vulcanizate | | V1 | V2 | V3 | V4 |
|---|---|---|---|---|---|
| Temperature and time: RT; 24 hours | | | | | |
| CS | % | 4 | 4 | 4 | 4 |
| Temperature and time: 100° C./24 hours | | | | | |
| CS | % | 7 | 14 | 9 | 14 |
| Temperature and time: 150° C./24 hours | | | | | |
| CS | % | 23 | 22 | 31 | 22 |

By virtue of the novel crosslinking structure with Lewis acid as a catalyst, it is also possible without any problem to establish unusually good compression sets, even at 150° C., still coupled with good elongation at break and maximum torque in the vulcanizate.

TABLE 7

Composition of the vulcanizable mixtures for vulcanizates V5-V7 (Inventive Examples with inorganic acids)

| Vulcanizable mixture for | | V5 | V6 | V7 |
|---|---|---|---|---|
| Polymer A | | 100 | | |
| Polymer B | | | 100 | |
| Polymer C | | | | 100 |
| CORAX ® N 550/30 | | 50 | 50 | 50 |
| DIPLAST ® TM 8-10/ST | | 5 | 5 | 5 |
| LUVOMAXX ® CDPA | | 1 | 1 | 1 |
| VULKANOX ® ZMB2/C5 | | 0.4 | 0.4 | 0.4 |
| potassium hydrogensulphate | | 4 | 4 | 4 |
| Total | phr | 160.4 | 160.4 | 160.4 |
| Density | g/ccm | 1.16 | 1.16 | 1.16 |

The mixtures were produced in a Banbury Mixer. For this purpose, the rubber and all additives specified in Table 6 were mixed at a maximum temperature of up to 120° C. for a total of 4 minutes. For this purpose, the rubber was initially charged in the mixer, all further additives were added after 1 minute, and after 2 further minutes a reversal step was conducted. After a total of 4 minutes, the rubber was discharged from the mixer. The compound was vulcanized at a temperature of 190° C. for 30 min.

The vulcanizates obtained had the properties reported in Tables 8 to 10:

TABLE 8

Vulcanizates V5-V7; vulcanization profile in the MDR (190° C./30 minutes)

| Vulcanizate | V5 | V6 | V7 |
|---|---|---|---|
| S max (dNm) | 7.9 | 15.5 | 33.1 |
| $t_{10}$ (min) | 0.8 | 0.6 | 0.9 |
| $t_{95}$ (min) | 24.4 | 21.3 | 12.7 |

The level of the respective maximum torque is in accordance with the proportions of monomers containing epoxide groups in the polymers in relation to the inorganic Brønsted acid. All crosslinkings were conducted without the addition of heavy metal compounds as a catalyst.

TABLE 9

Vulcanizates V5-V7; properties

| Vulcanizate | | | V5 | V6 | V7 |
|---|---|---|---|---|---|
| Crosslinking temperature | ° C. | 190 | | | |
| Crosslinking time | min | | 30 | 30 | 30 |
| TS | MPa | | 13.5 | 12.4 | 12.0 |
| EB | % | | 487 | 250 | 150 |
| M50 | MPa | | 1.3 | 2.1 | 3 |
| M100 | MPa | | 2 | 4.1 | 7.1 |
| M300 | MPa | | 7.8 | | |
| Hardness | Shore A | | 71 | 65 | 74 |

The elongations at break and tensile strengths can be adjusted via the ratio of epoxide to acid.

TABLE 10

Vulcanizates V5-V7; compression set at RT; 100° C. and 150° C.

| Vulcanizate | | V5 | V6 | V7 |
|---|---|---|---|---|
| Temperature and time: RT, 24 hours | | | | |
| CS | % | 13 | 3 | 1 |
| Temperature and time: 100° C., 24 hours | | | | |
| CS | % | 26 | 16 | 7 |
| Temperature and time: 150° C., 24 hours | | | | |
| CS | % | 69 | 51 | 29 |

With inorganic acids too as the catalyst, it is possible to establish unusually good compression sets even at 150° C.

TABLE 11

Composition of the vulcanizable mixtures for vulcanizates V8-V12 (Inventive Examples with organic acids)

| Vulcanizable mixture for | V8 | V9 | V10 | V11 | V12 |
|---|---|---|---|---|---|
| Polymer B | 100 | | | | |
| Polymer C | | 100 | 100 | 100 | 100 |
| CORAX ® N 550/30 | 50 | 50 | 50 | 50 | 50 |
| DIPLAST ® TM 8-10/ST | 5 | 5 | 5 | 5 | 5 |
| LUVOMAXX ® CDPA | 1 | 1 | 1 | 1 | 1 |
| VULKANOX ® ZMB2/C5 | 0.4 | 0.4 | 0.4 | 0.4 | 0.4 |
| CYCAT ® 600 | 4 | 4 | | | |
| CYCAT ® 4040 | | | 2 | | |
| ascorbic acid | | | | 2 | |
| DDBS | | | | | 1.4 |
| Total phr | 160.4 | 160.4 | 158.4 | 158.4 | 157.8 |
| Density g/ccm | 1.14 | 1.14 | 1.14 | 1.14 | 1.14 |

The vulcanizates obtained had the properties reported in Tables 12 to 14:

TABLE 12

Vulcanizates V8-V12, vulcanization profile in the MDR (190° C./30 minutes)

| Vulcanizates | V8 | V9 | V10 | V11 | V12 |
|---|---|---|---|---|---|
| S max(dNm) | 19.8 | 25.8 | 24.1 | 19.6 | 25.9 |
| $t_{10}$ (min) | 0.9 | 0.8 | 0.8 | 1.3 | 1.0 |
| $t_{95}$ (min) | 24.8 | 23.6 | 22.8 | 21.5 | 23.8 |

The level of the respective maximum torque is in accordance with the proportions of monomers containing epoxide groups in the polymers in relation to the organic Brønsted acid. All crosslinkings were conducted without the addition of heavy metal compounds as a catalyst or any other compounds.

TABLE 13

Vulcanizates V8-V12, properties

| Mixture | | | V8 | V9 | V10 | V11 | V12 |
|---|---|---|---|---|---|---|---|
| Crosslinking temperature | ° C. | 190 | | | | | |

TABLE 13-continued

Vulcanizates V8-V12, properties

| Mixture | | V8 | V9 | V10 | V11 | V12 |
|---|---|---|---|---|---|---|
| Crosslinking time | min | 30 | 30 | 30 | 30 | 30 |
| TS | MPa | 17.6 | 15.4 | 24.7 | 20.8 | 23.5 |
| EB | % | 347 | 168 | 328 | 348 | 301 |
| M50 | MPa | 1.4 | 3.5 | 1.9 | 1.9 | 2 |
| M100 | MPa | 2.8 | 8 | 4.5 | 4.2 | 4.8 |
| M300 | MPa | 14.7 | | 22.7 | 17.6 | 23.1 |
| Hardness | Shore A | 60 | 71 | 66 | 65 | 66 |

The elongations at break and tensile strengths can be adjusted via the ratio of epoxide to acid and the selection of the acid.

TABLE 14

Vulcanizates V8-V12; compression set at RT, 110° C. and 150° C.

| Mixture | | V8 | V9 | V10 | V11 | V12 |
|---|---|---|---|---|---|---|
| Temperature and time: RT; 24 hours | | | | | | |
| CS | % | 4 | 3 | nd[1)] | nd | nd |
| Temperature and time: 110° C.; 24 hours | | | | | | |
| CS | % | 17 | 10 | nd | nd | nd |
| Temperature and time: 150° C.; 24 hours | | | | | | |
| CS | % | 52 | 36 | 34 | 47 | 36 |

[1)]nd: not determined

With these organic acids too and all of those which follow as the catalyst, it is possible to establish unusually good compression sets even at 150° C.

TABLE 15

Composition of the vulcanizable mixtures for vulcanizates V13-V16

| Vulcanizable mixture for | V13 | V14 | V15 | V16 |
|---|---|---|---|---|
| Polymer C | 100 | 100 | 100 | 100 |
| CORAX ® N 550/30 | 50 | 50 | 50 | 50 |
| DIPLAST ® TM 8-10/ST | 5 | 5 | 5 | 5 |
| LUVOMAXX ® CDPA | 1 | 1 | 1 | 1 |
| VULKANOX ® ZMB2/C5 | 0.4 | 0.4 | 0.4 | 0.4 |
| TBAHS | 0.5 | 1 | 2 | 4 |
| Total phr | 156.9 | 157.4 | 158.4 | 160.4 |
| Density g/ccm | 1.14 | 1.14 | 1.14 | 1.14 |

The vulcanizates obtained had the properties reported in Tables 16 to 18:

TABLE 16

Vulcanizates V13-V16; vulcanization profile in the MDR at 190° C./30 minutes

| Vulcanizates | V13 | V14 | V15 | V16 |
|---|---|---|---|---|
| S max (dNm) | 27.7 | 25.5 | 20.0 | 12.6 |
| $t_{10}$ (min) | 3.5 | 2.2 | 2.4 | 1.7 |
| $t_{95}$ (min) | 26.3 | 24.3 | 23.1 | 24.0 |

The level of the respective maximum torque is in accordance with the proportions of monomers containing epoxide groups in the polymers in relation to the organic Brønsted acid. All crosslinkings were conducted without the addition of heavy metal compounds as a catalyst or any other compounds.

TABLE 17

Vulcanizates V13-V16; properties

| Vulcanizates | | V13 | V14 | V15 | V16 |
|---|---|---|---|---|---|
| Crosslinking temperature | ° C. | 190 | | | |
| Crosslinking time | min | 30 | 30 | 30 | 30 |
| TS | MPa | 20 | 19.1 | 22.7 | 22.2 |
| EB | % | 251 | 236 | 434 | 581 |
| M50 | MPa | 3 | 2.7 | 1.8 | 1.3 |
| M100 | MPa | 7.4 | 6.8 | 3.9 | 2.44 |
| M300 | MPa | | | 16 | 10.8 |
| Hardness | Shore A | 73 | 72 | 64 | 61 |

Elongation at break and tensile strength can be adjusted via the ratio of epoxide to acid.

TABLE 18

Vulcanizates V13-V16; compression set at 150° C./24 hours

| Temperature: | | Vulcanizates | | | |
|---|---|---|---|---|---|
| 150° C./24 hours | | V13 | V14 | V15 | V16 |
| CS | % | 21 | 17 | 28 | 49 |

TABLE 19

Vulcanizable mixture for vulcanizate V17 (Inventive Examples with buffer system)

| Vulcanizable mixture for | | V17 |
|---|---|---|
| Polymer C | | 100 |
| CORAX ® N 550/30 | | 50 |
| DIPLAST ® TM 8-10/ST | | 5 |
| LUVOMAXX ® CDPA | | 1 |
| VULKANOX ® ZMB2/C5 | | 0.4 |
| ascorbic acid | | 2 |
| sodium ascorbate | | 2.24 |
| Total | phr | 160.6 |
| Density | g/ccm | 1.14 |

The vulcanizate obtained had the properties reported in Tables 20 to 22:

TABLE 20

Vulcanizate V17, vulcanization profile in the MDR (190° C./30 minutes)

| Mixture | V17 |
|---|---|
| S max (dNm) | 15.3 |
| $t_{10}$ (min) | 1.5 |
| $t_{95}$ (min) | 21.9 |

All crosslinkings were conducted without the addition of heavy metal compounds as a catalyst or any other compounds.

TABLE 21

Vulcanizate V17, properties

| Vulcanizate | | V17 |
|---|---|---|
| Crosslinking temperature | °C. | 190 |
| Crosslinking time | min | 30 |
| TS | MPa | 17.6 |
| EB | % | 377 |
| M50 | MPa | 1.7 |
| M100 | MPa | 3.5 |
| M300 | MPa | 14.1 |
| Hardness | Shore A | 65 |

TABLE 22

Vulcanizate V17; compression set at 150° C./24 hours

| Temperature and time: 150° C., 24 hours | | Vulcanizate V17 |
|---|---|---|
| CS | % | 43 |

With buffer systems too, it is thus possible to establish unusually good compression sets even at 150° C.

What is claimed is:

1. A vulcanizable composition comprising:
   (i) at least one nitrile rubber containing epoxy groups and comprising repeat units derived from at least one conjugated diene, at least one α,β-unsaturated nitrile, and at least one monomer which contains epoxy groups, but not from a nonconjugated cyclic polyene, wherein the monomer which contains epoxy groups is selected from the group consisting of 2-ethylglycidyl acrylate, 2-ethylglycidyl methacrylate, 2-(n-propyl) glycidyl acrylate, 2-(n-propyl)glycidyl methacrylate, 2-(n-butyl)glycidyl acrylate, 2-(n-butyl)glycidyl methacrylate, glycidyl methacrylate, glycidylmethyl methacrylate, glycidyl acrylate, (3',4'-epoxyheptyl)-2-ethyl acrylate, (3',4'-epoxyheptyl)-2-ethyl methacrylate, 6',7'-epoxyheptyl acrylate, 6',7'-epoxyheptyl methacrylate, allyl glycidyl ether, allyl 3,4-epoxyheptyl ether, 6,7-epoxyheptyl allyl ether, vinyl glycidyl ether, vinyl 3,4-epoxyheptyl ether, 3,4-epoxyheptyl vinyl ether, 6,7-epoxyheptyl vinyl ether, o-vinylbenzyl glycidyl ether, m-vinylbenzyl glycidyl ether, p-vinylbenzyl glycidyl ether, and 3-vinylcyclohexene oxide;
   (ii) at least one crosslinker comprising at least one of:
      at least one Lewis acid selected from the group consisting of aluminium trichloride, indium(III) chloride, zinc chloride, iron(II) oxide, iron(III) oxide, iron(III) chloride, silicon tetrachloride, lithium bromide, lithium chloride, magnesium chloride, scandium(III) triflate, and rhodium(III) chloride and
      at least one Brønsted acid selected from the group consisting of potassium hydrogensulphate, ammonium hydrogensulphate, tetraalkylammonium hydrogensulphates, potassium dihydrogenphosphate, disodium hydrogenphosphate, sodium dihydrogenphosphate, ammonium chloride, ammonium sulphate, ammonium carbonate, ammonium hydroxide, dodecylbenzylsulphonic acid, p-toluenesulphonic acid, ascorbic acid, acetic acid, acrylic acid, fumaric acid, maleic acid, benzoic acid, abietic acid, and oleic acid; and
   (iii) crosslinkers other than those specified under (ii) in an amount of 0 to 2.5 parts by weight, based on 100 parts by weight of the nitrile rubber (i).

2. The vulcanizable composition according to claim 1, wherein the vulcanizable composition contains no other crosslinkers other than those specified under (i).

3. The vulcanizable composition according to claim 1, wherein the composition includes the at least one additional crosslinker (iii) in an amount less than 2.5 parts by weight, based on 100 parts by weight of the nitrile rubber (i).

4. The vulcanizable composition according to claim 3, wherein the at least one additional crosslinker (iii) is present in an amount of less than 1 part by weight, based on 100 parts by weight of the nitrile rubber (i).

5. A vulcanizable composition comprising:
   (i) at least one nitrile rubber containing epoxy groups, wherein the nitrile rubber is fully hydrogenated or partially hydrogenated and comprises repeat units derived from at least one conjugated diene, at least one α,β-unsaturated nitrile, and optionally one or more further copolymerizable monomers, but not from a nonconjugated cyclic polyene;
   (ii) at least one crosslinker comprising at least one of:
      at least one Lewis acid selected from the group consisting of boron trihydride, aluminium trichloride, indium(III) chloride, copper(II) chloride, copper(I) triflate, gold(III) chloride, gold(I) chloride, zinc chloride, tin(IV) oxide, tin(IV) chloride, copper(II) oxide, iron(II) oxide, iron(III) oxide, iron(III) bromide, iron(III) chloride, sulphur trioxide, silicon tetrachloride, lithium bromide, lithium chloride, magnesium chloride, scandium(III) triflate, rhodium (III) chloride, and complexes of the following elements in the following oxidation states: Co(III), Al(III), Fe(III), Fe(II), Sn(IV), Co(II), Ni(0), Ni(II), Cu(II), Cu(I), Pb(II), Sn(II), Sn(IV), Ag(I), Au(I), Au(III), Pd(II), Pt(II), Sc(III), Ir(III), Rh(III) and In(III), and
      at least one Brønsted acid selected from the group consisting of sulphuric acid, hydrogensulphates, sulphurous acid, hydrogensulphites, hydrogen sulphide, hydrogensulphides, dipotassium hydrogenphosphate, potassium dihydrogenphosphate, disodium hydrogenphosphate, sodium dihydrogenphosphate, calcium hydrogenphosphate, trisodium hydrogendiphosphate, disodium hydrogendiphosphate, diphosphonic acid and the partial esters thereof, metaphosphoric acid, triphosphonic acid and the partial esters thereof, hydrogen carbonates, acids of the halogens, hypohalous acids, halous acids, halic acids, perhalic acids, ammonium chloride, ammonium sulphate, ammonium carbonate, ammonium hydroxide, inorganic and organic sulphonic acid, ascorbic acid, acetic acid, propionic acid, acrylic acid, fumaric acid, maleic acid, benzoic acid, abietic acid, oleic acid, phosphonic acid, and the mono- or diesters thereof; and
   at least one additional crosslinker (iii) other than those specified under (ii), in an amount of 0 to 2.5 parts by weight, based on 100 parts by weight of the nitrile rubber (i).

6. The vulcanizable composition according to claim 5, wherein:
   the at least one crosslinker comprises at least one of:
      at least one Lewis acid selected from the group consisting of aluminium trichloride, indium(III) chloride, zinc chloride, iron(II) oxide, iron(III) oxide, iron(III) chloride, silicon tetrachloride, lithium bromide, lithium chloride, magnesium chloride, scandium(III) triflate, and rhodium(III) chloride, and at least one Brønsted acid selected from the group consisting of potassium hydrogensulphate, ammonium hydrogensulphate, tetraalkylammonium hydrogensulphates, potassium dihydrogenphosphate, disodium hydrogenphosphate, sodium dihydrogenphosphate, ammonium chloride, ammonium sulphate, ammonium carbonate, ammonium hydroxide, dodecylbenzylsulphonic acid, p-toluenesulphonic acid, ascorbic acid, acetic acid, acrylic acid, fumaric acid, maleic acid, benzoic acid, abietic acid, and oleic acid.

7. The vulcanizable composition according to claim 5, wherein the nitrile rubber (i) is at least one of:
 a nitrile rubber in which the epoxy groups are applied to the nitrile rubber by subsequent grafting of compounds containing epoxy groups, and
 a nitrile rubber having repeat units of at least one nitrile, of at least one conjugated diene, of at least one monomer containing epoxy groups, and optionally of one or more further copolymerizable monomers, but none of any nonconjugated cyclic polyenes.

8. The vulcanizable composition according to claim 5, wherein the nitrite rubber (i) has repeat units derived from a monomer which contains epoxy groups, wherein the monomer which contains epoxy groups is at least one of o-vinylbenzylglycidyl ether, m-vinylbenzylglycidyl ether, p-vinylbenzylglycidyl ether, 3-vinylcyclohexene oxide, and monomers of the general formula (I)

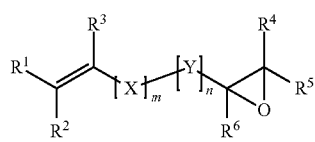

in which
 m is 0 or 1 and
 X is O, O(CR$_2$)$_p$, (CR$_2$)$_p$O, C(=O)O, C(=O)O(CR$_2$)$_p$, C(=O)NR, (CR$_2$)$_p$, N(R), N(R)(CR$_2$)$_p$, P(R), P(R)(CR$_2$)$_p$, P(=O)(R), P(=O)(R)(CR$_2$)$_p$, S, S(CR$_R$), S(=O), S(=O)(CR$_2$)$_p$, S(=O)$_2$(CR$_2$)$_p$ or S(=O)$_2$,
 Y represents repeat units of one or more mono- or polyunsaturated monomers, comprising conjugated or nonconjugated dienes, alkynes and vinyl compounds, or a structural element which derives from polymers comprising polyethers, especially polyalkylene glycol ethers and polyalkylene oxides, polysiloxanes, polyols, polycarbonates, polyurethanes, polyisocyanates, polysaccharides, polyesters and polyamides,
 n and p are the same or different and are each in the range from 0 to 10 000, and
 R, R$^1$, R$^2$, R$^3$, R$^4$, R$^5$ and R$^6$ are the same or different and are each H, a linear or branched, saturated or mono- or polyunsaturated alkyl radical, a saturated or mono- or polyunsaturated carbo- or heterocycyl radical, aryl, heteroaryl, arylalkyl, heteroarylalkyl, alkoxy, aryloxy, heteroaryloxy, amino, amido, carbamoyl, alkylthio, arylthio, sulphanyl, thiocarboxyl, sulphinyl, sulphono, sulphino, sulpheno, sulphonic acids, sulphamoyl, hydroxyimino, alkoxycarbonyl, F, Cl, Br, I, hydroxyl, phosphonato, phosphinato, silyl, silyloxy, nitrile, borates, selenates, carbonyl, carboxyl, oxycarbonyl, oxysulphonyl, oxo, thioxo, epoxy, cyanates, thiocyanates, isocyanates, thioisocyanates or isocyanides.

9. The vulcanizable composition according to claim 5, wherein the nitrile rubber (i) has repeat units derived from a monomer which contains epoxy groups, wherein the monomer which contains epoxy groups is selected from the group consisting of 2-ethylglycidyl acrylate, 2-ethylglycidyl methacrylate, 2-(n-propyl)glycidyl acrylate, 2-(n-propyl) glycidyl methacrylate, 2-(n-butyl)glycidyl acrylate, 2-(n-butyl)glycidyl methacrylate, glycidyl methacrylate, glycidylmethyl methacrylate, glycidyl acrylate, (3',4'-epoxyheptyl)-2-ethyl acrylate, (3',4'-epoxyheptyl)-2-ethyl methacrylate, 6',7'-epoxyheptyl acrylate, 6',7'-epoxyheptyl methacrylate, allyl glycidyl ether, allyl 3,4-epoxyheptyl ether, 6,7-epoxyheptyl allyl ether, vinyl glycidyl ether, vinyl 3,4-epoxyheptyl ether, 3,4-epoxyheptyl vinyl ether, 6,7-epoxyheptyl vinyl ether, o-vinylbenzyl glycidyl ether, m-vinylbenzyl glycidyl ether, p-vinylbenzyl glycidyl ether and 3-vinylcyclohexene oxide.

10. A vulcanizable composition comprising:
 (i) at least one nitrile rubber containing epoxy groups and comprising repeat units derived from at least one conjugated diene, at least one α,β-unsaturated nitrile, and optionally one or more further copolymerizable monomers, but not from a nonconjugated cyclic polyene, and
 (ii) at least one crosslinker comprises at least one of:
  at least one Lewis acid in a buffer mixture, wherein the at least one Lewis acid is selected from the group consisting of boron trihydride, aluminium trichloride, indium(III) chloride, copper(II) chloride, copper(I) triflate, gold(III) chloride, gold(I) chloride, zinc chloride, tin(IV) oxide, tin(IV) chloride, copper (II) oxide, iron(II) oxide, iron(III) oxide, iron(III) bromide, iron(III) chloride, sulphur trioxide, silicon tetrachloride, lithium bromide, lithium chloride, magnesium chloride, scandium(III) triflate, rhodium (III) chloride, and complexes of the following elements in the following oxidation states: Co(III), Al(III), Fe(III), Fe(II), Sn(IV), Co(II), Ni(0), Ni(II), Cu(II), Cu(I), Pb(II), Sn(II), Sn(IV), Ag(I), Au(I), Au(III), Pd(II), Pt(II), Sc(III), Ir(III), Rh(III) and In(III), and
  at least one Brønsted acid in a buffer mixture, wherein the at least one Brønsted acid is selected from the group consisting of sulphuric acid, hydrogenphosphates, sulphurous acid, hydrogensulphites, hydrogen sulphide, hydrogensulphides, dipotassium hydrogenphosphate, potassium dihydrogenphosphate, disodium hydrogenphosphate, sodium dihydrogenphosphate, calcium hydrogenphosphate, trisodium hydrogendiphosphate, disodium hydrogendiphosphate, diphosphonic acid and the partial esters thereof, metaphosphoric acid, triphosphonic acid and the partial esters thereof, hydrogen carbonates, acids of the halogens, hypohalous acids, halous acids, halic acids, perhalic acids, ammonium chloride, ammonium sulphate, ammonium carbonate, ammonium hydroxide, inorganic and organic sulphonic acid, ascorbic acid, acetic acid, propionic acid, acrylic acid, fumaric acid, maleic acid, benzoic acid, abietic acid, oleic acid, phosphonic acid, and the mono- or diesters thereof.

11. A vulcanizable composition comprising:
 (i) at least one nitrile rubber containing epoxy groups and comprising repeat units derived from at least one conjugated diene, at least one α,β-unsaturated nitrile, and at least one monomer containing epoxy groups, but not from a nonconjugated cyclic polyene, where a proportion of the repeat units derived from the monomer containing epoxy groups is 2% to 35% by weight, based on overall nitrile rubber, (ii) 1 to 30 parts by weight of at least one crosslinker, based in each case on 100 parts by weight of the nitrile rubber (i), wherein the at least one crosslinker comprises at least one of:

at least one Lewis acid selected from the group consisting of boron trihydride, aluminium trichloride, indium(III) chloride, copper(II) chloride, copper(I) triflate, gold(III) chloride, gold(I) chloride, zinc chloride, tin(IV) oxide, tin(IV) chloride, copper(II) oxide, iron(II) oxide, iron(III) oxide, iron(III) bromide, iron(III) chloride, sulphur trioxide, silicon tetrachloride, lithium bromide, lithium chloride, magnesium chloride, scandium(III) triflate, rhodium (III) chloride, and complexes of the following elements in the following oxidation states: Co(III), Al(III), Fe(III), Fe(II), Sn(IV), Co(II), Ni(0), Ni(II), Cu(II), Cu(I), Pb(II), Sn(II), Sn(IV), Ag(I), Au(I), Au(III), Pd(II), Pt(II), Sc(III), Ir(III), Rh(III) and In(III), and at least one Brønsted acid selected from the group consisting of sulphuric acid, hydrogensulphates, sulphurous acid, hydrogensulphites, hydrogen sulphide, hydrogensulphides, dipotassium hydrogenphosphate, potassium dihydrogenphosphate, disodium hydrogenphosphate, sodium dihydrogenphosphate, calcium hydrogenphosphate, trisodium hydrogendiphosphate, disodium hydrogendiphosphate, diphosphonic acid and the partial esters thereof, metaphosphoric acid, triphosphonic acid and the partial esters thereof, hydrogen carbonates, acids of the halogens, hypohalous acids, halous acids, halic acids, perhalic acids, ammonium chloride, ammonium sulphate, ammonium carbonate, ammonium hydroxide, inorganic and organic sulphonic acid, ascorbic acid, acetic acid, propionic acid, acrylic acid, fumaric acid, maleic acid, benzoic acid, abietic acid, oleic acid, phosphonic acid, and the mono- or diesters thereof; and (iii) at least one additional crosslinker other than those specified under (ii), in an amount of 0 to 2.5 parts by weight, based on 100 parts by weight of the nitrile rubber (i).

12. The vulcanizable composition according to claim 11, wherein:
the repeat units of the at least one nitrile rubber consist of the repeat units derived from the at least one conjugated diene, the at least one α,β-unsaturated nitrile, and at least one monomer containing epoxy groups, where the proportion of the repeat units derived from the monomer containing epoxy groups is 2.25 to 30% by weight, based on overall nitrile rubber,
the vulcanizable composition contains 1.5 to 25 parts by weight of the crosslinker (ii), based on 100 parts by weight of the nitrile rubber (i), and
the vulcanizable composition contains not more than 1.5 parts by weight of the crosslinkers (iii) based on 100 parts by weight of the nitrile rubber (i).

13. The vulcanizable composition according to claim 11, wherein:
the repeat units of the at least one nitrile rubber consist of repeat units derived from a) acrylonitrile, b) 1,3-butadiene, c) glycidyl acrylate and/or glycidyl methacrylate, where a proportion of glycidyl acrylate and/or glycidyl methacrylate is 2.5 to 30% by weight, based on overall nitrile rubber,
the vulcanizable composition contains 1.5 to 25 parts by weight of the crosslinker (ii), based on 100 parts by weight of the nitrile rubber (i), and
the vulcanizable composition contains not more than 1.5 parts by weight of the crosslinkers (iii) based on 100 parts by weight of the nitrile rubber (i) containing epoxy groups.

14. A process for producing a vulcanizable composition according to claim 1, the process comprising mixing component (i) with component (i).

15. A process for producing vulcanizates based on an optionally partly or fully hydrogenated nitrile rubber containing epoxy groups, the process comprising crosslinking the vulcanizable composition according to claim 1 at a temperature of 20 to 250° C.

16. A vulcanizate obtained by the process according to claim 15.

17. The vulcanizable composition according to claim 11, wherein:
the proportion of the repeat units derived from the monomer containing epoxy groups is 2.7 to 12.5% by weight, based on overall nitrile rubber,
the vulcanizable composition contains 2 to 15 parts by weight of the crosslinker (ii), based in each case on 100 parts by weight of the nitrile rubber (i), and
the vulcanizable composition contains not more than 0.4 parts by weight of the crosslinkers (iii) based on 100 parts by weight of the nitrile rubber (i).

* * * * *